US010439857B2

(12) United States Patent
Zhang et al.

(10) Patent No.: US 10,439,857 B2
(45) Date of Patent: Oct. 8, 2019

(54) UE, NETWORK NODE, AND METHOD FOR DETERMINING TRANSMITTING MANNER OF DOWNLINK SIGNAL OF CELL

(71) Applicant: Huawei Technologies Co., Ltd., Shenzhen, Guangdong (CN)

(72) Inventors: Peng Zhang, Shanghai (CN); Min Xu, Shanghai (CN); Yueying Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/811,418

(22) Filed: Nov. 13, 2017

(65) Prior Publication Data
US 2018/0069739 A1 Mar. 8, 2018

Related U.S. Application Data

(63) Continuation of application No. PCT/CN2015/078963, filed on May 14, 2015.

(51) Int. Cl.
*H04B 7/06* (2006.01)
*H04L 1/00* (2006.01)
(Continued)

(52) U.S. Cl.
CPC ....... *H04L 27/2646* (2013.01); *H04B 7/0689* (2013.01); *H04J 11/005* (2013.01);
(Continued)

(58) Field of Classification Search
CPC ....... H04L 1/00; H04L 5/0053; H04L 1/0003; H04L 1/0072; H04L 1/1874; H04L 1/0643; H04L 1/1657; H04L 1/1825
(Continued)

(56) References Cited

U.S. PATENT DOCUMENTS

2012/0269151 A1* 10/2012 Lee, II ................. H04L 5/0007
370/329
2013/0077578 A1* 3/2013 Wang ................ H04W 72/1278
370/329
(Continued)

FOREIGN PATENT DOCUMENTS

CN 1445945 A 10/2003
CN 101123442 A 2/2008
(Continued)

OTHER PUBLICATIONS

"3rd Generation Partnership Project;Technical Specification Group Radio Access Network;Physical channels and mapping of transport channels onto physical channels (FDD)(Release 12)"; 3GPP TS 25.211 V12.1.0; Dec. 2014; 67 pages.
(Continued)

*Primary Examiner* — David C Payne
*Assistant Examiner* — Sarah Hassan
(74) *Attorney, Agent, or Firm* — Leydig, Voit & Mayer, Ltd.

(57) ABSTRACT

The present application discloses a UE, network node, and method for determining a transmitting manner of a downlink signal of a cell. The UE obtains first attribute indication information of a first cell, where the first cell is any cell other than a cell serving the UE, and the first attribute indication information of the first cell includes at least one of: a radio access standard supported for signal transmitting by the first cell, a frequency band supported for signal transmitting by the first cell, an PCI supported for signal transmitting by the first cell, a modulation mode supported for signal transmitting by the first cell, or an MIMO antenna mode supported for signal transmitting by the first cell; and the UE determines a transmitting manner of a downlink signal of the first
(Continued)

cell according to the obtained first attribute indication information of the first cell.

12 Claims, 6 Drawing Sheets

(51) Int. Cl.
 *H04J 11/00* (2006.01)
 *H04W 72/04* (2009.01)
 *H04L 27/26* (2006.01)
 *H04B 7/0452* (2017.01)

(52) U.S. Cl.
 CPC .............. *H04L 1/00* (2013.01); *H04L 1/0072* (2013.01); *H04W 72/042* (2013.01); *H04B 7/0452* (2013.01); *H04B 7/0634* (2013.01)

(58) Field of Classification Search
 USPC .......................................... 370/328; 455/434
 See application file for complete search history.

(56) References Cited

U.S. PATENT DOCUMENTS

| | | | | |
|---|---|---|---|---|
| 2013/0215831 A1* | 8/2013 | Pang | ..................... | H04L 1/0004 370/328 |
| 2013/0295928 A1* | 11/2013 | Suzuki | .................. | H04W 48/16 455/434 |
| 2017/0163433 A1 | 6/2017 | Luo et al. | | |

FOREIGN PATENT DOCUMENTS

| | | |
|---|---|---|
| CN | 101577610 A | 11/2009 |
| CN | 101616445 A | 12/2009 |
| CN | 102447668 A | 5/2012 |
| CN | 104380643 A | 2/2015 |
| WO | 2011088638 A1 | 7/2011 |
| WO | 2013192160 A1 | 12/2013 |
| WO | 2014182491 A1 | 11/2014 |
| WO | 2015044408 A1 | 4/2015 |

OTHER PUBLICATIONS

"3rd Generation Partnership Project;Technical Specification Group Radio Access Network;Multiplexing and channel coding (FDD)(Release 12)"; 3GPP TS 25.212 V12.1.0; Dec. 2014; 167 pages.

"3rd Generation Partnership Project;Technical Specification Group Radio Access Network;Spreading and modulation (FDD)(Release 12)"; 3GPP TS 25.213 V12.0.0; Sep. 2014; 50 pages.

"3rd Generation Partnership Project;Technical Specification Group Radio Access Network;Physical layer procedures (FDD)(Release 12)"; 3GPP TS 25.214 V12.2.0; Mar. 2015; 137 pages.

Nokia et al.; "Network assistance for advanced receivers"; 3GPP TSG RAN WG1 Meeting #76; R1-140576; Feb. 10-14, 2014; 5 pages.

* cited by examiner

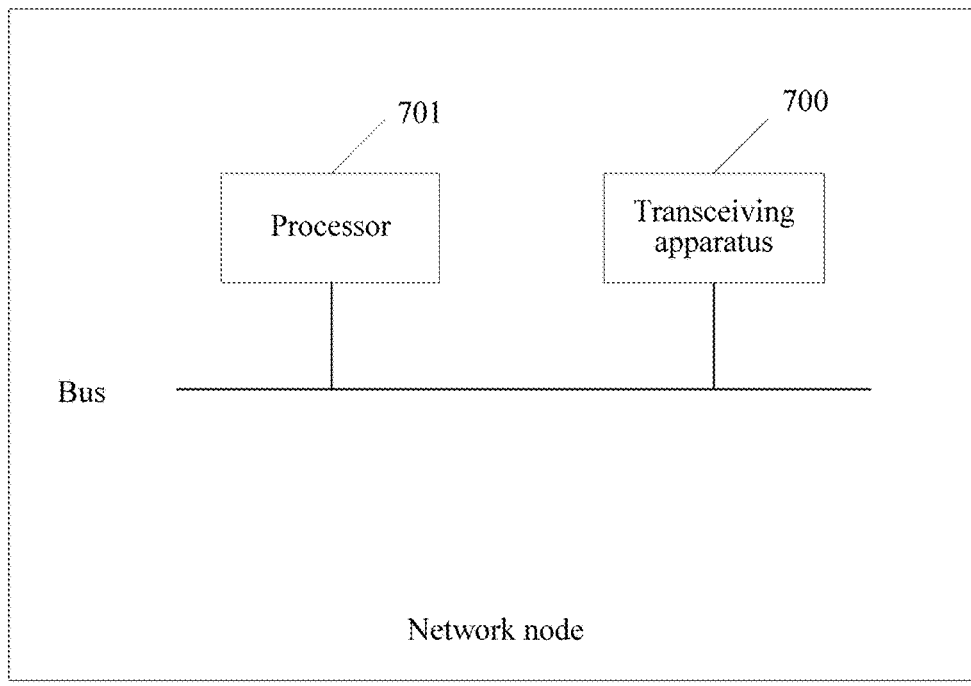

FIG. 7

User equipment (UE) obtains first attribute indication information of a first cell, where the first cell is any cell other than a cell serving the UE, and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell ⸺ S800

The UE obtains a transmitting manner of a downlink signal of the first cell according to the obtained first attribute indication information of the first cell ⸺ S801

FIG. 8

UE, NETWORK NODE, AND METHOD FOR DETERMINING TRANSMITTING MANNER OF DOWNLINK SIGNAL OF CELL

CROSS-REFERENCE TO RELATED APPLICATIONS

This application is a continuation of International Application No. PCT/CN2015/078963, filed on May 14, 2015, the disclosure of which is hereby incorporated by reference in its entirety.

TECHNICAL FIELD

The present application relates to the field of communications technologies, and in particular, to user equipment (UE), a network node, and a method for determining a transmitting manner of a downlink signal of a cell.

BACKGROUND

In a wideband code division multiple access (WCDMA) cellular network, cells served by a base station have respective coverage areas, and provide downlink services to UEs within the respective coverage areas. To achieve highest frequency spectrum efficiency, the WCDMA cellular network generally uses a single-frequency network manner. That is, all neighboring cells use a same carrier. Therefore, coverage areas of cells whose frequency bands are the same may overlap. For UE within an overlapped area, downlink signals of two or even more cells are likely to be received at the same time. When intra-frequency signals from the cells are relatively strong, the UE suffers from severe interference, affecting communication quality.

As shown in FIG. 1, user equipment 1 is within an overlapped coverage area of two cells of a same base station (i.e., a base station 1), and user equipment 2 is within an overlapped coverage area of two cells of different base stations (i.e., the base station 1 and a base station 2, where a radio access standard (i.e., Radio Access Technology) of the base station 1 may be any one of universal mobile telecommunications system (UMTS), long term evolution (LTE), global system for mobile communication (GSM), or code division multiple access (CDMA), and a radio access standard of the base station 2 may be any one of UMTS, LTE, GSM, or CDMA). Assuming that a serving cell of the user equipment 1 is the cell 1, a signal transmitted by the cell 2 is an interfering signal for the user equipment 1. Assuming that a serving cell of the user equipment 2 is the cell 2, regardless of whether a radio access standard of the cell 2 is the same as a radio access standard of a cell 3, a signal transmitted by the cell 3 is also an interfering signal for the user equipment 2. For the user equipment 1, the user equipment 1 needs to cancel interference of the interfering signal (i.e., the signal of the cell 2) to improve downlink service quality of the user equipment 1. However, in the prior art, the user equipment 1 does not know a transmitting manner (including a modulation mode, a used single-antenna or multiple-antenna manner or precoding control indication (PCI) manner, and the like) supported by the cell 2. Therefore, the user equipment 1 needs to detect, among all possibly supported transmitting manners, a transmitting manner being used by the cell 2. Relatively many resources are needed to complete detection work, and moreover, detection accuracy is also reduced. For example, a modulation mode used when a cell transmits a signal includes quadrature phase shift keying (QPSK), quadrature amplitude modulation (e.g., 16QAM, 64QAM, 256QAM). The user equipment 1 needs to detect, among all the foregoing possible modulation modes, a modulation mode being used by the cell 2. When the user equipment 1 considers, after detection, that the cell 2 is using 64QAM, if the cell 2 uses only the modulation modes QPSK and 16QAM and does not use 64QAM and 256QAM, the detection by the user equipment 1 is incorrect, and interference of the interfering signal from the cell 2 cannot be canceled.

SUMMARY

The present application provides user equipment (UE), a network node, and a method for determining a transmitting manner of a downlink signal of a cell, to reduce a range in which UE detects first attribute indication information of an interfering cell, and improve detection accuracy.

To resolve the foregoing technical problem, a first aspect of the present application provides user equipment (UE), including:

an obtaining module, configured to obtain first attribute indication information of a first cell, where the first cell is any cell other than a cell serving the UE, and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and a determining module, configured to determine a transmitting manner of a downlink signal of the first cell according to the first attribute indication information of the first cell obtained by the obtaining module.

With reference to the implementation of the first aspect, in a first possible implementation of the first aspect, the obtaining module obtains the first attribute indication information of the first cell from a radio network controller RNC, and the determining module includes:

a first determining unit, configured to determine, according to the first attribute indication information of the first cell, a type of each attribute supported for signal transmitting by the first cell; and a second determining unit, configured to determine the transmitting manner of the downlink signal of the first cell according to the type of each attribute supported for signal transmitting by the first cell.

With reference to the first possible implementation of the first aspect, in a second possible implementation of the first aspect, the MIMO antenna mode supported for signal transmitting by the first cell is indicated by secondary pilot information of the first cell included in the first attribute indication information of the first cell.

With reference to the first possible implementation of the first aspect, in a third possible implementation of the first aspect, the first attribute indication information of the first cell carries release information supported for signal transmitting by the first cell and/or first identification information of the attribute supported for signal transmitting by the first cell, where the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

With reference to the implementation of the first aspect, in a fourth possible implementation of the first aspect, the obtaining module further obtains second attribute indication information of the first cell, where the second attribute indication information of the first cell includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting; and the determining module is further configured to:

determine the transmitting manner of the downlink signal of the first cell according to the second attribute indication information of the first cell obtained by the obtaining module.

With reference to the fourth possible implementation of the first aspect, in a fifth possible implementation of the first aspect, the obtaining module includes:

a first obtaining unit, configured to obtain, by using a detected first channel transmitted by a network node, second identification information carried by the first channel, where the second identification information is used to identify the second attribute indication information of the first cell; and a second obtaining unit, configured to determine the second attribute indication information of the first cell according to the second identification information obtained by the first obtaining unit.

A second aspect of the present application provides user equipment (UE), including a transceiver apparatus and a processor, where the transceiver apparatus is configured to obtain first attribute indication information of a first cell, where the first cell is any cell other than a cell serving the UE, and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and the processor is configured to determine a transmitting manner of a downlink signal of the first cell according to the obtained first attribute indication information of the first cell.

With reference to the implementation of the second aspect, in a first possible implementation of the second aspect, when determining the transmitting manner of the downlink signal of the first cell according to the obtained first attribute indication information of the first cell, the processor specifically performs the following steps:

determining, according to the first attribute indication information of the first cell, a type of each attribute supported for signal transmitting by the first cell; and determining the transmitting manner of the downlink signal of the first cell according to the type of each attribute supported for signal transmitting by the first cell.

With reference to the first possible implementation of the second aspect, in a second possible implementation of the second aspect, the MIMO antenna mode supported for signal transmitting by the first cell is indicated by secondary pilot information of the first cell included in the first attribute indication information of the first cell.

With reference to the first possible implementation of the second aspect, in a third possible implementation of the second aspect, the first attribute indication information of the first cell carries release information supported for signal transmitting by the first cell and/or first identification information of the attribute supported for signal transmitting by the first cell, where the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

With reference to the implementation of the second aspect, in a fourth possible implementation of the second aspect, the transceiver apparatus further obtains second attribute indication information of the first cell, where the second attribute indication information of the first cell includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting; and the processor is further configured to:

determine the transmitting manner of the downlink signal of the first cell according to the obtained second attribute indication information of the first cell.

With reference to the fourth possible implementation of the second aspect, in a fifth possible implementation of the second aspect, the transceiver apparatus is further configured to perform the following steps:

obtaining, by using a first channel that is transmitted by a network node and detected by the processor, second identification information carried by the first channel, where the second identification information is used to identify the second attribute indication information of the first cell; and the processor is further configured to perform the following step:

determining the second attribute indication information of the first cell according to the second identification information.

A third aspect of the present application provides a network node, including:

a generation module, configured to generate first attribute indication information of a first cell, where the first cell is any cell other than a cell serving user equipment (UE), and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and a sending module, configured to send the first attribute indication information of the first cell to the UE, so that the UE obtains the first attribute indication information of the first cell, and determines a transmitting manner of a downlink signal of the first cell according to the obtained first attribute indication information of the first cell.

With reference to the implementation of the third aspect, in a first possible implementation of the third aspect, the MIMO antenna mode supported for signal transmitting by the first cell is indicated by secondary pilot information of the first cell included in the first attribute indication information of the first cell.

With reference to the implementation of the third aspect, in a second possible implementation of the third aspect, the first attribute indication information of the first cell carries release information supported for signal transmitting by the first cell and/or first identification information of an attribute supported for signal transmitting by the first cell, where the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

With reference to the implementation of the third aspect, in a third possible implementation of the third aspect, the generation module is further configured to generate second attribute indication information of the first cell, where the second attribute indication information of the first cell includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting.

With reference to the third possible implementation of the third aspect, in a fourth possible implementation of the third aspect, the sending module is further configured to:

transmit, to the UE, a first channel used to carry second identification information, where the second identification information is used to identify the second attribute indication information of the first cell, so that the UE obtains the second identification information by using the detected first channel, and determines the second attribute indication information of the first cell according to the second identification information.

A fourth aspect of the present application provides a network node, including a transceiver apparatus and a processor, where the processor is configured to generate first attribute indication information of a first cell, where the first cell is any cell other than a cell serving user equipment (UE), and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and the transceiver apparatus is configured to send the first attribute indication information of the first cell to the UE, so that the UE obtains the first attribute indication information of the first cell, and determines a transmitting manner of a downlink signal of the first cell according to the obtained first attribute indication information of the first cell.

With reference to the implementation of the fourth aspect, in a first possible implementation of the fourth aspect, the MIMO antenna mode supported for signal transmitting by the first cell is indicated by secondary pilot information of the first cell included in the first attribute indication information of the first cell.

With reference to the implementation of the fourth aspect, in a second possible implementation of the fourth aspect, the first attribute indication information of the first cell carries release information supported for signal transmitting by the first cell and/or first identification information of an attribute supported for signal transmitting by the first cell, where the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

With reference to the implementation of the fourth aspect, in a third possible implementation of the fourth aspect, the processor is further configured to generate second attribute indication information of the first cell, where the second attribute indication information of the first cell includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting.

With reference to the third possible implementation of the fourth aspect, in a fourth possible implementation of the fourth aspect, the transceiver apparatus is further configured to transmit, to the UE, a first channel used to carry second identification information, where the second identification information is used to identify the second attribute indication information of the first cell, so that the UE obtains the second identification information by using the detected first channel, and determines the second attribute indication information of the first cell according to the second identification information.

A fifth aspect of the present application provides a method for determining a transmitting manner of a downlink signal of a cell, including:

obtaining, by user equipment (UE), first attribute indication information of a first cell, where the first cell is any cell other than a cell serving the UE, and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and determining, by the UE, a transmitting manner of a downlink signal of the first cell according to the obtained first attribute indication information of the first cell.

With reference to the implementation of the fifth aspect, in a first possible implementation of the fifth aspect, the determining, by the UE, a transmitting manner of a downlink signal of the first cell according to the obtained first attribute indication information of the first cell includes:

determining, by the UE according to the first attribute indication information of the first cell, a type of each attribute supported for signal transmitting by the first cell; and determining, by the UE, the transmitting manner of the downlink signal of the first cell according to the type of each attribute supported for signal transmitting by the first cell.

With reference to the first possible implementation of the fifth aspect, in a second possible implementation of the fifth aspect, the MIMO antenna mode supported for signal transmitting by the first cell is indicated by secondary pilot information of the first cell included in the first attribute indication information of the first cell.

With reference to the first possible implementation of the fifth aspect, in a third possible implementation of the fifth aspect, the first attribute indication information of the first cell carries release information supported for signal transmitting by the first cell and/or first identification information of the attribute supported for signal transmitting by the first cell, where the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

With reference to the implementation of the fifth aspect, in a fourth possible implementation of the fifth aspect, the UE further obtains second attribute indication information of the first cell, where the second attribute indication information of the first cell includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting; and the determining, by the UE, a transmitting manner of a downlink signal of the first cell according to the obtained first attribute indication information of the first cell specifically includes:

determining, by the UE, the transmitting manner of the downlink signal of the first cell according to the obtained second attribute indication information of the first cell.

With reference to the fourth possible implementation of the fifth aspect, in a fifth possible implementation of the fifth aspect, that the UE further obtains second attribute indication information of the first cell includes:

obtaining, by the UE by using a detected first channel transmitted by a network node, second identification information carried by the first channel, where the second identification information is used to identify the second attribute indication information of the first cell; and determining, by the UE, the second attribute indication information of the first cell according to the second identification information.

A sixth aspect of the present application provides a method for determining a transmitting manner of a downlink signal of a cell, including:

generating, by a network node, first attribute indication information of a first cell, where the first cell is any cell other than a cell serving user equipment (UE), and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and sending, by the network node, the first attribute indication information of the first cell to the UE, so that the UE obtains the first attribute indication information of the first cell, and determines a transmitting manner of a downlink signal of the first cell according to the obtained first attribute indication information of the first cell.

With reference to the implementation of the sixth aspect, in a first possible implementation of the sixth aspect, the MIMO antenna mode supported for signal transmitting by the first cell is indicated by secondary pilot information of the first cell included in the first attribute indication information of the first cell.

With reference to the implementation of the sixth aspect, in a second possible implementation of the sixth aspect, the first attribute indication information of the first cell carries release information supported for signal transmitting by the first cell and/or first identification information of an attribute supported for signal transmitting by the first cell, where the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

With reference to the implementation of the sixth aspect, in a third possible implementation of the sixth aspect, the network node further generates second attribute indication information of the first cell, where the second attribute indication information of the first cell includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting.

With reference to the third possible implementation of the sixth aspect, in a fourth possible implementation of the sixth aspect, the sending, by the network node, the first attribute indication information of the first cell to the UE, so that the UE obtains the first attribute indication information of the first cell includes:

transmitting, by the network node to the UE, a first channel used to carry second identification information, where the second identification information is used to identify the second attribute indication information of the first cell, so that the UE obtains the second identification information by using the detected first channel, and determines the second attribute indication information of the first cell according to the second identification information.

By means of the present application, user equipment (UE) obtains first attribute indication information of a first cell, where the first cell is any cell other than a cell serving the UE, and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and the UE determines a transmitting manner of a downlink signal of the first cell according to the obtained first attribute indication information of the first cell. Before the UE detects an attribute of an interfering cell for signal transmitting, a network node informs the UE of first attribute indication information of the interfering cell, including at least one of a radio access standard, a frequency band, a PCI, a modulation mode, or a MIMO antenna mode supported for signal transmitting by the interfering cell. In this way, a range in which the UE detects the attribute of the interfering cell for signal transmitting can be reduced, resources used in a detection process can be reduced, and detection accuracy can be improved, thereby accurately canceling interference of a signal transmitted by the interfering cell.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

FIG. 7 is a schematic structural diagram of another embodiment of a network node in the embodiments of the present application;

FIG. 8 is a schematic flowchart of an embodiment of a method for determining a transmitting manner of a downlink signal of a cell in the embodiments of the present application;

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

The embodiments of the present application provide UE, a network node, and a method for determining a transmitting manner of a downlink signal of a cell, to reduce a range in which UE detects first attribute indication information of an interfering cell, and improve detection accuracy.

Figure 1:
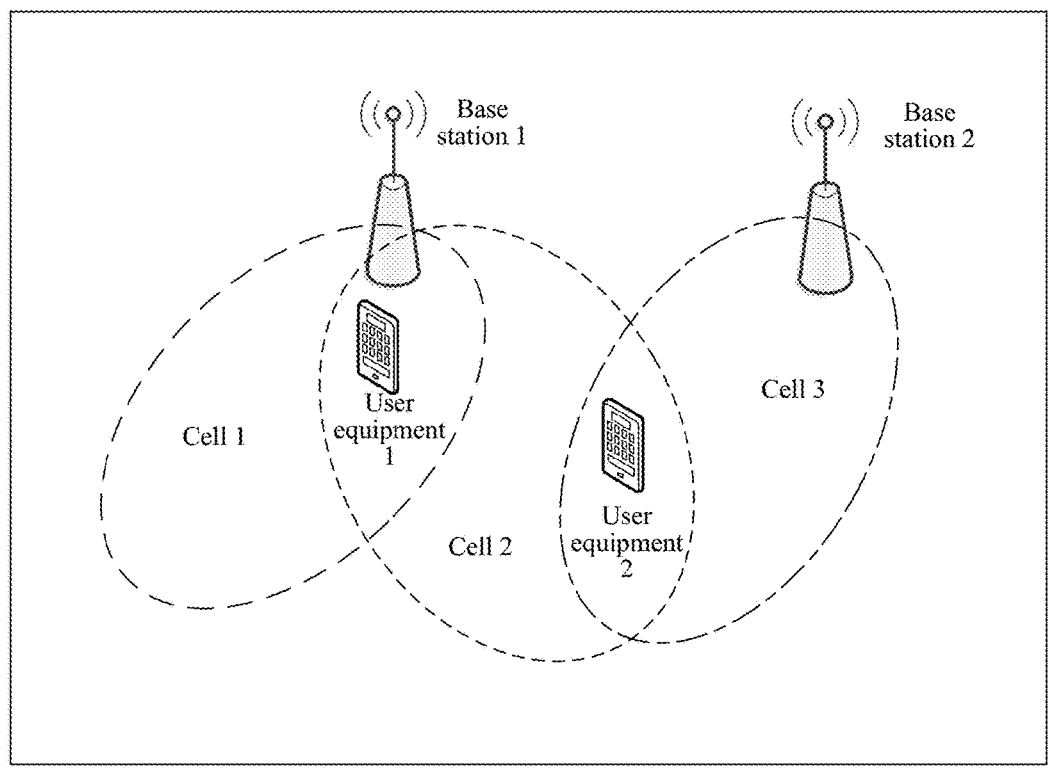
FIG. 1 is a schematic diagram of coverage areas of cells.
Figure 2:
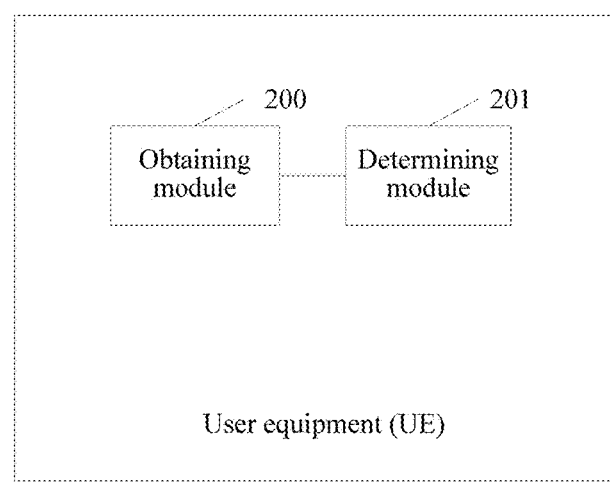
FIG. 2 is a schematic structural diagram of an embodiment of user equipment (UE) in the embodiments of the present application.

Referring to FIG. 2, FIG. 2 is a schematic structural diagram of an embodiment of user equipment (UE) in the embodiments of the present application. The UE shown in FIG. 2 includes an obtaining module 200 and a determining module 201.

The obtaining module 200 is configured to obtain first attribute indication information of a first cell, where the first cell is any cell other than a cell serving the UE, and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell.

During specific implementation, the UE may obtain the first attribute indication information of the first cell by using a network node (the network node is a radio network controller (RNC) or a base station). When the network node is an RNC, the UE obtains the first attribute indication information by using RRC signaling sent by the network node. When the network node is a base station, the UE obtains the first attribute indication information by using physical layer signaling sent by the network node. The RNC is a key network element of a third generation mobile communications technology (3G) network, is an integral part of an access network, and is also a switching and control element of the access network. The RNC is mainly used to manage and control multiple base stations. Functions of the RNC include a radio resource management function and a control function. The radio resource management function is mainly used to maintain stability of radio propagation and service quality of a wireless connection. The control function includes all functions related to radio bearer setup, maintenance, and release. The base station may be a base station serving the UE, or may be a base station serving the first cell. In this embodiment of the present application, the first cell is any cell other than the cell serving the UE. For the UE, the first cell is an interfering cell or a neighboring cell. Therefore, a downlink signal transmitted by the first cell is an interfering signal.

During specific implementation, the foregoing mode supported by the first cell may include a mode currently used by the first cell, or may include a mode that is not currently used by the first cell but can be used by the first cell.

During specific implementation, the radio access standard supported for signal transmitting by the first cell may be UMTS, LTE, GSM, CDMA, or the like. UMTS is a 3G mobile telephone technology. UMTS integrates a 3G technology and is a subsequent standard of the GSM standard. A premise for implementing UMTS is a currently widely used GSM mobile telephone system, which is a second generation mobile phone communications technology (2G) system. LTE is long term evolution, formulated by the Third Generation Partnership Project, of a UMTS technology standard. LTE introduces key technologies such as orthogonal frequency division multiplexing and multiple-input multiple-output (MIMO). GSM is a mobile telephone standard most widely applied at present, and is considered as a 2G mobile telephone system. CDMA is a wireless communications technology, and may be used for any protocol in the second generation and third generation wireless communications. CDMA is compatible with other cellular technologies, achieving roaming across a country.

During specific implementation, the frequency band supported for signal transmitting by the first cell that is indicated by the first attribute indication information of the first cell may include a location of a frequency channel number (the frequency channel number is a number for a fixed frequency) and/or bandwidth. The frequency band supported for signal transmitting by the first cell that is indicated by the first attribute indication information may be an entire frequency band, a partial frequency band, or a partial frequency band overlapped with a frequency band of the cell serving the UE, used for signal transmitting by the first cell.

In an implementation, the first attribute indication information of the first cell is used to indicate signal transmit power of the first cell or a signal transmitting scheduling status of the first cell. The scheduling status is used to indicate a data scheduling status or a signaling sending status or the like of the first cell in a selected frequency band, and specifically includes statuses such as whether the first cell is scheduling data or sending signaling.

During specific implementation, the modulation mode supported for signal transmitting by the first cell that is indicated by the first attribute indication information of the first cell may include at least one of QPSK, 16QAM, 64QAM, or 256QAM. QPSK is a modulation method for conveying data by means of conversion or modulation, and is used for phasing of a reference signal. QAM is a modulation mode for performing amplitude modulation on two orthogonal carriers, and a signal set transmitted by using QAM may be conveniently represented by using a constellation graph. Each constellation point in the constellation graph corresponds to one signal of the transmitted signal set. A size of the transmitted signal set of the orthogonal amplitude modulation is A, and is generally represented by using A-QAM. Common QAM forms include 16QAM, 64QAM, 256QAM, and the like. A larger transmitted signal set indicates a larger volume of data carried on same bandwidth.

During specific implementation, the MIMO antenna mode indicated by the first attribute indication information of the first cell includes at least one of a single antenna mode or a multi-antenna mode. The single antenna mode is a non-MIMO mode, and the multi-antenna mode is any one of a 2*2MIMO mode or a 4*4MIMO mode. A MIMO technology refers to using multiple transmit antennas and receive antennas at a transmit end and a receive end of a base station of the first cell respectively, so that signals are transmitted and received by using the multiple antennas at the transmit end and the receive end, thereby improving communication quality. The MIMO antenna mode may be indicated by using N*M MIMO, where N represents a quantity of transmit antennas, and M represents a quantity of receive antennas. Therefore, 2*2MIMO is used to indicate that a quantity of transmit antennas is 2, and a quantity of receive antennas is 2.

During specific implementation, PCI is a multi-antenna sending technology in which corresponding processing is performed on a transmitted signal by using channel status information obtained by a transmit end, to cancel mutual interference during data sending, so that a signal in transmission and a transport channel are better matched, to improve system performance. If the MIMO antenna mode supported for signal transmitting by the first cell is the 2*2MIMO mode, the PCI supported for signal transmitting by the first cell that is indicated by the first attribute indication information includes at least one PCI in four PCIs. If the MIMO antenna mode supported for signal transmitting by the first cell is the 4*4MIMO mode, the PCI supported for signal transmitting by the first cell that is indicated by the first attribute indication information includes at least one PCI in 16 PCIs.

The determining module 201 is configured to determine a transmitting manner of a downlink signal of the first cell according to the first attribute indication information of the first cell obtained by the obtaining module 200.

During specific implementation, the UE determines the transmitting manner of the downlink signal of the first cell according to the received first attribute indication information of the first cell, where the transmitting manner of the downlink signal of the first cell includes at least one of the following: the radio access standard supported for signal transmitting by the first cell, the frequency band supported for signal transmitting by the first cell, the precoding control indication (PCI) supported for signal transmitting by the first cell, the modulation mode supported for signal transmitting by the first cell, or the multiple-input multiple-output (MIMO) antenna mode supported for signal transmitting by the first cell. An example in which the first attribute indication information includes one transmitting manner (for example, includes the modulation mode supported by the first cell) is used. If the modulation mode supported by the first cell that is indicated by the first attribute indication information includes QPSK and 16QAM (where the first cell is capable of using QPSK and 16QAM, but the first cell currently uses QPSK), the UE determines that the first cell supports the QPSK modulation mode or the 16QAM modulation mode, and therefore eliminates a possibility that the first cell supports the 64QAM and 256QAM modulation modes. Alternatively, if the modulation mode supported by the first cell that is indicated by the first attribute indication information does not include such types as 64QAM and 256QAM (that is, the first cell is not capable of using 64QAM and 256QAM), the UE can directly eliminate a possibility that the first cell supports the 64QAM and 256QAM modulation modes. Therefore, the UE needs only to detect, between the two modes QPSK and 16QAM, a modulation mode being used by the first cell, and does not need to detect the two modulation modes 64QAM and 256QAM, thereby reducing a detection range of the UE, and improving detection accuracy. When detecting that the first cell uses QPSK, the UE determines that the transmitting manner of the first cell is the QPSK modulation mode. That the UE detects, between the two modes QPSK and 16QAM, a modulation mode being used by the first cell belongs to the prior art, and details are not described in this embodiment.

During specific implementation, an example in which the first attribute indication information includes two or more transmitting manners (for example, includes the modulation mode supported by the first cell and the multiple-input multiple-output (MIMO) antenna mode supported for signal transmitting by the first cell) is used. If the modulation mode supported by the first cell that is indicated by the first attribute indication information includes QPSK and 16QAM, and the MIMO antenna mode supported by the first cell that is indicated by the first attribute indication information includes the 2*2MIMO mode and the 4*4MIMO mode (where the first cell is capable of using the 2*2MIMO mode and the 4*4MIMO mode, but the first cell currently uses the 2*2MIMO mode), or if the modulation mode indicated by the first attribute indication information does not include such types as 64QAM and 256QAM, and the MIMO antenna mode indicated by the first attribute indication information does not include a non-MIMO mode, the UE determines that the first cell supports either of the QPSK and 16QAM modulation modes, and supports either of the 2*2MIMO mode and the 4*4MIMO mode. When detecting that the first cell uses the QPSK modulation mode and the 2*2MIMO mode, the UE determines that the transmitting manner of the first cell is the QPSK modulation mode and the 2*2MIMO mode.

Figure 3:
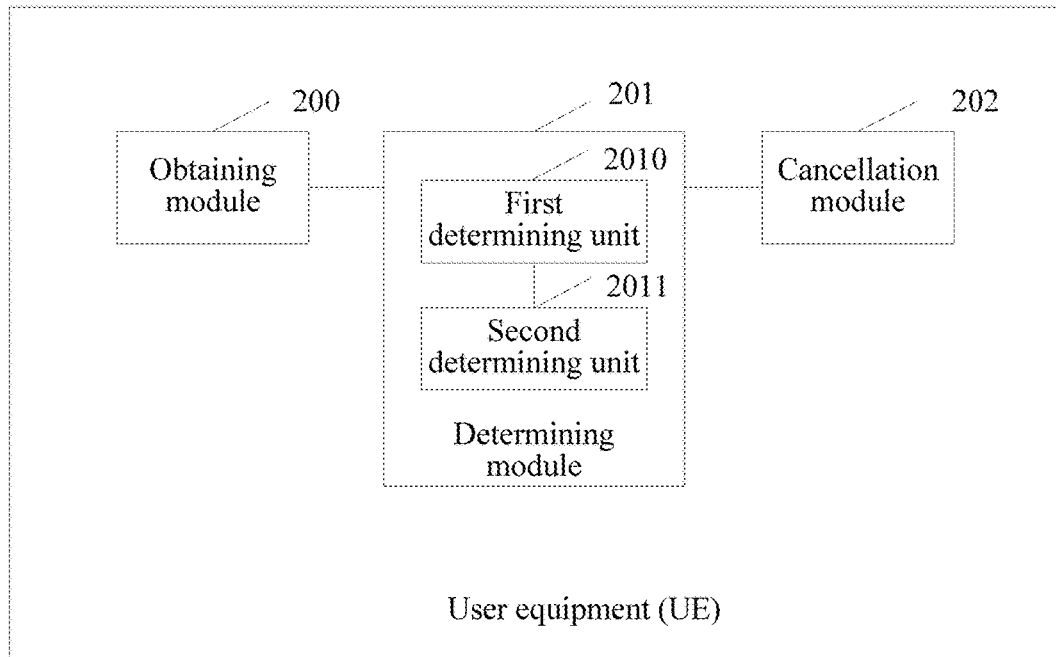
FIG. 3 is a schematic structural diagram of another embodiment of user equipment (UE) in the embodiments of the present application.

In an implementation, as shown in FIG. 3, the determining module 201 includes a first determining unit 2010 and a second determining unit 2011.

The first determining unit 2010 is configured to determine, according to the first attribute indication information of the first cell, a type of each attribute supported for signal transmitting by the first cell.

The second determining unit 2011 is configured to determine the transmitting manner of the downlink signal of the first cell according to the type, determined by the first determining unit, of each attribute supported for signal transmitting by the first cell.

The network node in this embodiment of the present application may be a radio resource controller (RNC) or a base station. That is, the network node may send the first attribute indication information to the UE by using RRC signaling or by using physical layer signaling. In this embodiment, the network node tends to send the first attribute indication information by using RRC signaling.

During specific implementation, the RNC may send the first attribute indication information of the first cell to the UE by using RRC signaling. The RRC signaling includes system information, RRC connection setup information, first cell information, radio bearer setup information, radio bearer reconfiguration information, radio bearer release information, physical channel reconfiguration information, transport channel reconfiguration information, cell update confirm information, and measurement control information.

During specific implementation, the foregoing mode supported by the first cell may include a mode currently used by the first cell, or may include a mode that is not currently used by the first cell but can be used by the first cell.

In an implementation, the MIMO antenna mode supported by the first cell is indicated by secondary pilot information of the first cell included in the first attribute indication information of the first cell. The secondary pilot information is used to indicate whether the first cell is configured with a secondary common pilot channel (S-CPICH). If the first cell is configured with an S-CPICH, it indicates that the MIMO antenna mode supported by the first cell is a multi-antenna mode (that is, a MIMO mode). If the first cell is not configured with an S-CPICH, it indicates that the MIMO antenna mode supported by the first cell is a single antenna mode (that is, a non-MIMO mode).

In an implementation, the secondary pilot information is used to indicate whether the first cell is configured with a code channel number of an S-CPICH. If the first cell is configured with a code channel number of an S-CPICH, it indicates that the MIMO antenna mode supported by the first cell is a multi-antenna mode, and the corresponding channel number is used. If the first cell is not configured with an S-CPICH, optionally rather than determinately, it indicates that the MIMO antenna mode supported by the first cell is a single antenna mode.

In an implementation, the secondary pilot information is used to indicate whether the first cell is configured with transmit power of an S-CPICH. If the first cell is configured with transmit power of an S-CPICH, it indicates that the MIMO antenna mode supported by the first cell is a multi-antenna mode, and the corresponding transmit power is used. If the first cell is not configured with an S-CPICH, optionally rather than determinately, it indicates that the MIMO antenna mode supported by the first cell is a single antenna mode. The transmit power of the S-CPICH may be represented by using a power offset of the transmit power of the S-CPICH relative to transmit power of a primary pilot P-CPICH.

During specific implementation, an example in which an attribute included in the first attribute indication information includes the modulation mode supported by the first cell is used (the attribute included in the first attribute indication information is at least one of the following: the radio access standard supported for signal transmitting by the first cell, the frequency band supported for signal transmitting by the first cell, the precoding control indication (PCI) supported for signal transmitting by the first cell, the modulation mode supported for signal transmitting by the first cell, or the multiple-input multiple-output (MIMO) antenna mode supported for signal transmitting by the first cell). If the modulation mode indicated by the first attribute indication information includes such types as QPSK and 16QAM (where the first cell is capable of using QPSK and 16QAM, but the first cell currently uses QPSK), the UE determines that the type of the modulation mode supported by the first cell is QPSK or 16QAM, and therefore eliminates a possibility that the first cell supports the 64QAM and 256QAM modulation modes. Alternatively, if the modulation mode indicated by the first attribute indication information does not include such types as 64QAM and 256QAM, the UE can directly eliminate a possibility that the first cell supports the 64QAM and 256QAM modulation modes.

During specific implementation, an example in which an attribute included in the first attribute indication information includes the modulation mode and the MIMO antenna mode supported by the first cell is used. If the modulation mode indicated by the first attribute indication information includes such types as QPSK and 16QAM, and the MIMO antenna mode indicated by the first attribute indication information includes such types as the 2*2MIMO mode and the 4*4MIMO mode (where the first cell is capable of using the 2*2MIMO mode and the 4*4MIMO mode, but the first cell currently uses the 2*2MIMO mode), the UE determines that the type of the modulation mode supported by the first cell is QPSK or 16QAM, and determines that the type of the MIMO antenna mode supported by the first cell is the 2*2MIMO mode or the 4*4MIMO mode.

During specific implementation, after determining that the type of the modulation mode supported by the first cell is one of the two QPSK and 16QAM modulation modes, the UE needs only to detect, between the two modes QPSK and 16QAM, a modulation mode being used by the first cell, and does not need to detect the two modulation modes 64QAM and 256QAM, thereby reducing a detection range of the UE, and improving detection accuracy. When detecting that the first cell uses QPSK, the UE determines that the transmitting manner of the first cell is the QPSK-type modulation mode.

During specific implementation, when the UE determines that the type of the modulation mode supported by the first cell is QPSK or 16QAM, and determines that the type of the MIMO antenna mode supported by the first cell is the 2*2MIMO mode or the 4*4MIMO mode, when detecting that the first cell uses the QPSK-type modulation mode and the 2*2MIMO-type mode, the UE determines that the transmitting manner of the first cell is the QPSK modulation mode and the 2*2MIMO mode.

In an implementation, the first attribute indication information of the first cell may further carry release information supported for signal transmitting by the first cell and/or first identification information of the attribute supported for signal transmitting by the first cell, where the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

During specific implementation, the first attribute indication information of the first cell may carry the release information supported for signal transmitting by the first cell. The release information supported for signal transmitting by the first cell and the radio access standard supported by the first cell, the frequency band supported by the first cell, the PCI supported by the first cell, the modulation mode supported by the first cell, and the MIMO antenna mode supported by the first cell are mutually bound. The release information supported by the first cell may be represented by using release N, where N is used to indicate a release number. For example, for a cell whose release is less than release 5, it indicates that a modulation mode supported by the cell is 64QAM, and a MIMO antenna mode supported for signal transmitting by the cell is a single antenna mode (that is, a non-MIMO mode). A cell whose release is greater than or equal to release 7 has a multi-antenna mode (a MIMO mode).

During specific implementation, the first attribute indication information of the first cell may carry the first identification information of the attribute (including at least one of the radio access standard, the frequency band, the PCI, the modulation mode, or the MIMO antenna mode supported for signal transmitting by the first cell) supported for signal transmitting by the first cell. When the first cell has a supported or used attribute, the first attribute indication information carries first identification information of the attribute. In addition, when the first cell has an attribute that is not supported or used, the first attribute indication information may also carry first identification information of the attribute that is not supported or used. For example, a MIMO antenna mode supported by a cell whose release is greater than or equal to release 7 may be the 2*2MIMO mode. Therefore, when the first cell supports the 2*2MIMO mode, the first attribute indication information may carry first identification information indicating that the first cell supports the 2*2MIMO mode, and therefore the UE determines, according to the identification, that the first cell supports the 2*2MIMO mode. If the first cell does not support the 2*2MIMO mode, the first attribute indication information may also carry first identification information indicating that the first cell does not support the 2*2MIMO mode, and therefore the UE determines, according to the first identification information, that the first cell does not support the 2*2MIMO mode, and the UE does not detect the 2*2MIMO mode. For another example, if the first cell uses 64QAM, the first attribute indication information may carry first identification information indicating that the first cell uses 64QAM, and therefore the UE determines, according to the first identification information, that the first cell uses 64QAM. If the first cell does not use 64QAM but is capable of using 64QAM, the first attribute indication information may also carry first identification information indicating that the first cell does not use 64QAM, and therefore the UE determines, according to the identification, that the first cell does not use 64QAM.

During specific implementation, the first attribute indication information of the first cell may carry the release information supported for signal transmitting by the first cell and the first identification information of the attribute supported for signal transmitting by the first cell. For example, if the release information of the first cell is release 10, a radio access standard supported by the first cell, a frequency band supported by the first cell, a PCI supported by the first cell, and a modulation mode supported by the first cell when a release is release 10 are learned; moreover, because the release of the first cell is greater than or equal to release 7, the first cell supports a multi-antenna mode (including the 2*2MIMO mode and the 4*4MIMO mode). If the first cell uses the 2*2MIMO mode, the first identification information may be used to indicate that the first cell uses the 2*2MIMO mode. Therefore, after obtaining the release information supported for signal transmitting by the first cell and the first identification information of the attribute supported for signal transmitting by the first cell, the UE not only can learn, by using the release information of the first cell, the radio access standard supported by the first cell, the frequency band supported by the first cell, the PCI supported by the first cell, and the modulation mode supported by the first cell, but also can learn, by using the first identification information, that a multi-antenna mode used by the first cell is the 2*2MIMO mode.

In an implementation, the network node may also send the first attribute indication information of the first cell to the UE by using physical layer signaling. The physical layer signaling may be a high speed shared control channel (HS-SCCH) or another dedicated physical channel.

In an implementation, the obtaining module 200 further obtains second attribute indication information of the first cell, where the second attribute indication information of the first cell includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting. The determining module 201 is further configured to:

determine the transmitting manner of the downlink signal of the first cell according to the second attribute indication information of the first cell obtained by the obtaining module 200.

In this embodiment of the present application, the base station may inform, by using the first attribute indication information, the UE of each attribute being currently used by the first cell, so that the UE can directly determine the transmitting manner of the downlink signal of the first cell according to each attribute being currently used by the first cell.

Figure 4:
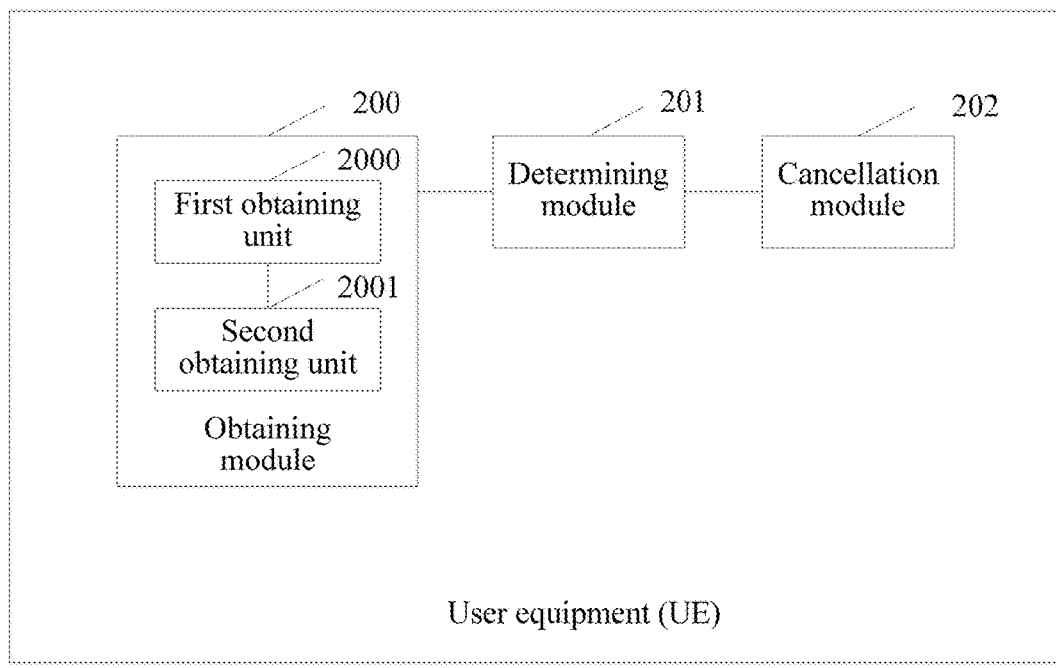
FIG. 4 is a schematic structural diagram of another embodiment of user equipment (UE) in the embodiments of the present application.

In an implementation, as shown in FIG. 4, the obtaining module 200 includes a first obtaining unit 2000 and a second obtaining unit 2001.

The first obtaining unit 2000 is configured to obtain, by using a detected first channel transmitted by a network node, second identification information carried by the first channel, where the second identification information is used to identify the second attribute indication information of the first cell.

The second obtaining unit 2001 is configured to determine the second attribute indication information of the first cell according to the second identification information obtained by the first obtaining unit.

During specific implementation, the base station obtains the second attribute indication information (including at least one of the radio access standard, the frequency band, the PCI, the modulation mode, or the MIMO antenna mode currently used by the first cell for signal transmitting) currently used by the first cell, generates, according to the second attribute indication information, the second identification information used to identify the second attribute indication information, carries the second identification information on the preset first channel, and then sends the first channel to the UE. The second attribute indication information includes third identification information of each attribute. The third identification information may be represented by using bit identification information. Using an example in which the third identification information indicates the modulation mode currently used by the first cell, as shown in Table 1, modulation modes may be separately indicated by using different third identification information.

TABLE 1

| Bit | Indicated modulation mode |
| --- | --- |
| 00 | QPSK |
| 01 | 16QAM |
| 10 | 64QAM |
| 11 | 256QAM |

During specific implementation, when the base station detects that the modulation mode currently used by the first cell is QPSK, the base station sets, in the second identification information carried on the first channel, the third identification information used to identify the modulation mode to bit identification information 00, and transmits the first channel. If the base station detects, after a preset time period, that the modulation mode currently used by the first cell changes to 16QAM, the base station changes, in the second identification information carried on the first channel, the third identification information used to identify the modulation mode to bit identification information 01, and continues to transmit the first channel. When detecting the first channel again, the UE obtains the second identification information carried by the first channel, and obtains, from the second identification information, the third identification information used to indicate the modulation mode currently used by the first cell.

During specific implementation, when obtaining, from the second identification information, the third identification information used to indicate the modulation mode currently used by the first cell, the UE may determine, according to the third identification information, the modulation mode currently used by the first cell. Specifically, when the UE obtains that the third identification information of the modulation mode currently used by the first cell is the bit identification information 00, the UE may determine that the modulation mode currently used by the first cell is QPSK. When the identification information changes to the bit identification information 01 after the preset time period, the UE determines that the modulation mode currently used by the first cell changes to 16QAM. For another attribute of the first cell for signal transmitting, refer to the foregoing embodiment, and details are not described again in this embodiment.

In an implementation, the obtaining module 200 is configured to obtain, by using a detected second channel transmitted by the network node, the second attribute indication information of the first cell, where the second channel is used to indicate the second attribute indication information of the first cell.

During specific implementation, the base station obtains an attribute (including at least one of the radio access standard, the frequency band, the PCI, the modulation mode, or the MIMO antenna mode currently used by the first cell for signal transmitting) currently used by the first cell for signal transmitting, carries, on the preset second channel, information related to the attribute currently used by the first cell for signal transmitting, so that the preset second channel is used to indicate the attribute currently used by the first cell for signal transmitting, and then transmits the second channel in an on-off keying (OOK) manner. For example, it is specified that the second channel is used to indicate that the modulation mode supported by the first cell in the second attribute indication information of the first cell is 64QAM and/or 256QAM. When learning that the first cell is using the 64QAM modulation mode and/or the 256QAM modulation mode, the base station transmits the second channel; otherwise, the base station does not transmit the second channel. When detecting the second channel transmitted by the base station, the UE may determine that the first cell uses 64QAM and/or 256QAM. If the UE does not detect the second channel transmitted by the base station, the UE may consider that the first cell does not use 64QAM and/or 256QAM, and therefore eliminate a possibility that the first cell uses 64QAM and/or 256QAM. Therefore, the UE does not need to detect the two modulation modes 64QAM and 256QAM. Alternatively, when learning that the first cell does not use the 64QAM modulation mode and/or the 256QAM modulation mode, the base station may also transmit the second channel; otherwise, the base station does not transmit the second channel. When detecting the second channel transmitted by the base station, the UE may learn that the first cell does not use 64QAM and/or 256QAM. If the UE does not detect the second channel transmitted by the base station, the UE may directly determine that the first cell uses 64QAM and/or 256QAM.

During specific implementation, the UE obtains the second attribute indication information by using the channel that is used to indicate the second attribute indication information and transmitted by the base station or by using the transmitted channel that carries the second identification information of the second attribute indication information, to learn each attribute currently used by the first cell, thereby directly determining the modulation mode currently used by the first cell for signal transmitting, without a need to additionally detect all modulation modes of the first cell.

In an implementation, as shown in FIG. 3 or FIG. 4, the UE further includes a cancellation module 202.

The cancellation module 202 is configured to cancel, according to the transmitting manner of the downlink signal of the first cell that is determined by the determining module, interference of the downlink signal transmitted by the first cell.

During specific implementation, after the UE determines the transmitting manner of the downlink signal of the first cell, the UE reconstructs the received downlink signal, and performs, according to the transmitting manner of the downlink signal of the first cell, interference cancellation (IC) on the downlink signal transmitted by the first cell, to improve a signal-to-noise ratio of a downlink signal of the serving cell of the UE, so that the serving cell provides a downlink service with better quality to the UE.

By means of the present application, the user equipment (UE) obtains first attribute indication information of a first cell, where the first cell is any cell other than a cell serving the UE, and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and the UE determines a transmitting manner of a downlink signal of the first cell according to the obtained first attribute indication information of the first cell. Before the UE detects an attribute of an interfering cell for signal transmitting, a network node informs the UE of first attribute indication information of the interfering cell, including at least one of a radio access standard, a frequency band, a PCI, a modulation mode, or a MIMO antenna mode supported for signal transmitting by the interfering cell. In this way, a range in which the UE detects the attribute of the interfering cell for signal transmitting can be reduced, resources used in a detection process can be reduced, and detection accuracy can be improved, thereby accurately canceling interference of an interfering signal transmitted by the interfering cell.

Figure 5:
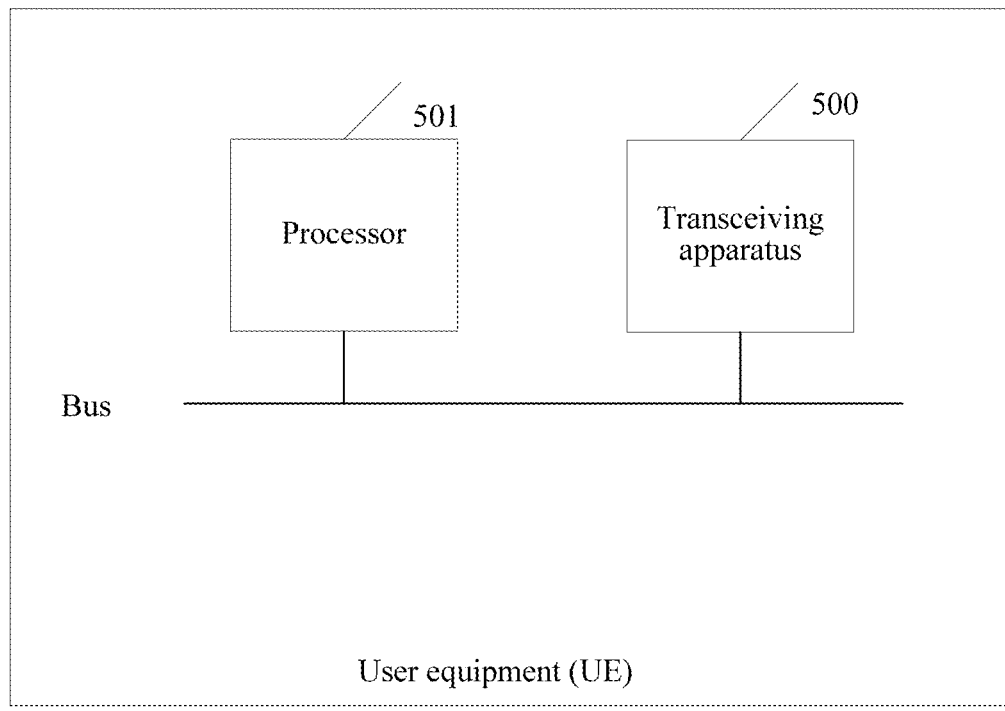
FIG. 5 is a schematic structural diagram of another embodiment of user equipment (UE) in the embodiments of the present application.

Referring to FIG. 5, FIG. 5 is a schematic structural diagram of another embodiment of user equipment (UE) in the embodiments of the present application. The user equipment (UE) shown in FIG. 5 includes a transceiver apparatus 500 and a processor 501 (the UE may have one or more processors 501, and an example of one processor is used in FIG. 5). In this embodiment of the present application, the transceiver apparatus 500 and the processor 501 may be connected by using a bus or in another manner. An example in which the transceiver apparatus 500 and the processor 501 are connected by using a bus is used in FIG. 5.

The transceiver apparatus 500 is configured to obtain first attribute indication information of a first cell, where the first cell is any cell other than a cell serving the UE, and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell.

The processor 501 is configured to determine a transmitting manner of a downlink signal of the first cell according to the obtained first attribute indication information of the first cell.

During specific implementation, the UE may obtain the first attribute indication information of the first cell by using a network node (the network node is an RNC or a base station).

During specific implementation, the radio access standard supported for signal transmitting by the first cell may be UMTS, LTE, GSM, CDMA, or the like.

During specific implementation, the foregoing mode supported by the first cell may include a mode currently used by the first cell, or may include a mode that is not currently used by the first cell but can be used by the first cell.

During specific implementation, the frequency band supported for signal transmitting by the first cell that is indicated by the first attribute indication information of the first cell may include a location of a frequency channel number (the frequency channel number is a number for a fixed frequency) and/or bandwidth.

During specific implementation, the modulation mode supported for signal transmitting by the first cell that is indicated by the first attribute indication information of the first cell may include at least one of QPSK, 16QAM, 64QAM, or 256QAM.

During specific implementation, the MIMO antenna mode indicated by the first attribute indication information of the first cell includes at least one of a single antenna mode or a multi-antenna mode.

During specific implementation, PCI is a multi-antenna sending technology in which corresponding processing is performed on a transmitted signal by using channel status information obtained by a transmit end, to cancel mutual interference during data sending, so that a signal in transmission and a transport channel are better matched, to improve system performance.

During specific implementation, the UE determines the transmitting manner of the downlink signal of the first cell according to the received first attribute indication information of the first cell, where the transmitting manner of the downlink signal of the first cell includes at least one of the following: the radio access standard supported for signal transmitting by the first cell, the frequency band supported for signal transmitting by the first cell, the precoding control indication (PCI) supported for signal transmitting by the first cell, the modulation mode supported for signal transmitting by the first cell, or the multiple-input multiple-output (MIMO) antenna mode supported for signal transmitting by the first cell. An example in which the first attribute indication information includes one transmitting manner (for example, includes the modulation mode supported by the first cell) is used. If the modulation mode supported by the first cell that is indicated by the first attribute indication information includes QPSK and 16QAM (where the first cell is capable of using QPSK and 16QAM, but the first cell currently uses QPSK), the UE determines that the first cell supports the QPSK modulation mode or the 16QAM modulation mode, and therefore eliminates a possibility that the first cell supports the 64QAM and 256QAM modulation modes. Alternatively, if the modulation mode supported by the first cell that is indicated by the first attribute indication information does not include such types as 64QAM and 256QAM (that is, the first cell is not capable of using 64QAM and 256QAM), the UE can directly eliminate a possibility that the first cell supports the 64QAM and 256QAM modulation modes. Therefore, the UE needs only to detect, between the two modes QPSK and 16QAM, a modulation mode being used by the first cell, and does not need to detect the two modulation modes 64QAM and 256QAM, thereby reducing a detection range of the UE, and improving detection accuracy. When detecting that the first cell uses QPSK, the UE determines that the transmitting manner of the first cell is the QPSK modulation mode. That the UE detects, between the two modes QPSK and 16QAM, a modulation mode being used by the first cell belongs to the prior art, and details are not described in this embodiment.

During specific implementation, an example in which the first attribute indication information includes two or more transmitting manners (for example, includes the modulation mode supported by the first cell and the multiple-input multiple-output (MIMO) antenna mode supported for signal transmitting by the first cell) is used. If the modulation mode supported by the first cell that is indicated by the first attribute indication information includes QPSK and 16QAM, and the MIMO antenna mode supported by the first cell that is indicated by the first attribute indication information includes the 2*2MIMO mode and the 4*4MIMO mode (where the first cell is capable of using the 2*2MIMO mode and the 4*4MIMO mode, but the first cell currently uses the 2*2MIMO mode), or if the modulation mode indicated by the first attribute indication information does not include such types as 64QAM and 256QAM, and the MIMO antenna mode indicated by the first attribute indication information does not include a non-MIMO mode, the UE determines that the first cell supports either of the QPSK and 16QAM modulation modes, and supports either of the 2*2MIMO mode and the 4*4MIMO mode. When detecting that the first cell uses the QPSK modulation mode and the 2*2MIMO mode, the UE determines that the transmitting manner of the first cell is the QPSK modulation mode and the 2*2MIMO mode.

In an implementation, when determining the transmitting manner of the downlink signal of the first cell according to the obtained first attribute indication information of the first cell, the processor 501 specifically performs the following steps:

determining, according to the first attribute indication information of the first cell, a type of each attribute supported for signal transmitting by the first cell; and determining the transmitting manner of the downlink signal of the first cell according to the type of each attribute supported for signal transmitting by the first cell.

The network node in this embodiment of the present application may be an RNC or a base station. That is, the network node may send the first attribute indication information to the UE by using RRC signaling or by using physical layer signaling. In this embodiment, the network node tends to send the first attribute indication information by using RRC signaling.

During specific implementation, the foregoing mode supported by the first cell may include a mode currently used by the first cell, or may include a mode that is not currently used by the first cell but can be used by the first cell.

In an implementation, the MIMO antenna mode supported for signal transmitting by the first cell is indicated by secondary pilot information of the first cell included in the first attribute indication information of the first cell.

In an implementation, the first attribute indication information of the first cell carries release information supported for signal transmitting by the first cell and/or first identification information of the attribute supported for signal transmitting by the first cell, where the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

In an implementation, the transceiver apparatus 500 further obtains second attribute indication information of the first cell, where the second attribute indication information of the first cell includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting.

In this case, the processor 501 is further configured to:

determine the transmitting manner of the downlink signal of the first cell according to the obtained second attribute indication information of the first cell.

In this embodiment of the present application, when the network node is a base station, the network node may inform, by using the first attribute indication information, the UE of each attribute being currently used by the first cell, so that the UE can directly determine the transmitting manner of the downlink signal of the first cell according to each attribute being currently used by the first cell.

In an implementation, the transceiver apparatus 500 is further configured to perform the following step:

obtaining, by using a first channel that is transmitted by a network node and detected by the processor, second identification information carried by the first channel, where the second identification information is used to identify the second attribute indication information of the first cell.

The processor is further configured to perform the following step:

determining the second attribute indication information of the first cell according to the second identification information.

During specific implementation, the base station may also send the second attribute indication information of the first cell to the UE by using physical layer signaling. The physical layer signaling may be an HS-SCCH or another dedicated physical channel.

During specific implementation, the base station obtains the second attribute indication information (including at least one of the radio access standard, the frequency band, the PCI, the modulation mode, or the MIMO antenna mode currently used by the first cell for signal transmitting) currently used by the first cell, generates, according to the second attribute indication information, the second identification information used to identify the second attribute indication information, carries the second identification information on the preset first channel, and then sends the first channel to the UE.

In an implementation, the processor 501 is further configured to perform the following step:

canceling, according to the determined transmitting manner of the downlink signal of the first cell, interference of the downlink signal transmitted by the first cell.

During specific implementation, after the UE determines the transmitting manner of the downlink signal of the first cell, the UE reconstructs the received downlink signal, and performs, according to the transmitting manner of the downlink signal of the first cell, interference cancellation on the downlink signal transmitted by the first cell, to improve a signal-to-noise ratio of a downlink signal of the serving cell of the UE, so that the serving cell provides a downlink service with better quality to the UE.

By means of the present application, the user equipment (UE) obtains first attribute indication information of a first cell, where the first cell is any cell other than a cell serving the UE, and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and the UE determines a transmitting manner of a downlink signal of the first cell according to the obtained first attribute indication information of the first cell. Before the UE detects an attribute of an interfering cell for signal transmitting, a network node informs the UE of first attribute indication information of the interfering cell, including at least one of a radio access standard, a frequency band, a PCI, a modulation mode, or a MIMO antenna mode supported for signal transmitting by the interfering cell. In this way, a range in which the UE detects the attribute of the interfering cell for signal transmitting can be reduced, resources used in a detection process can be reduced, and detection accuracy can be improved, thereby accurately canceling interference of an interfering signal transmitted by the interfering cell.

Figure 6:
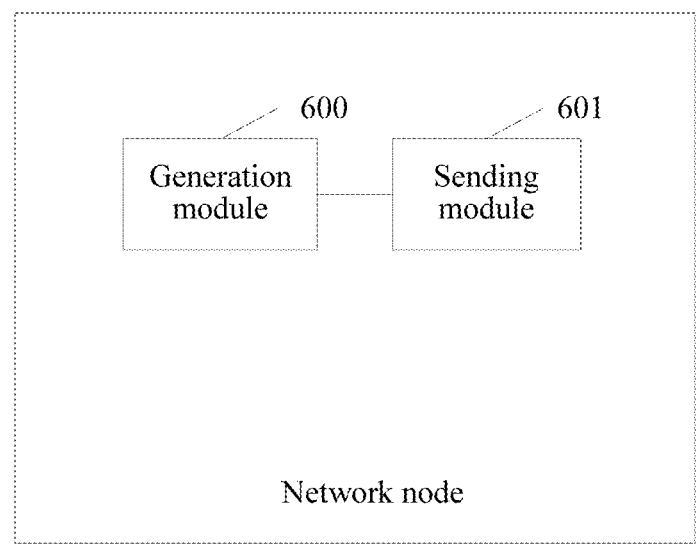
FIG. 6 is a schematic structural diagram of an embodiment of a network node in the embodiments of the present application.

Referring to FIG. 6, FIG. 6 is a schematic structural diagram of an embodiment of a network node in the embodiments of the present application. The network node shown in FIG. 6 includes a generation module 600 and a sending module 601.

The generation module 600 is configured to generate first attribute indication information of a first cell, where the first cell is any cell other than a cell serving user equipment (UE), and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell.

The sending module 601 is configured to send the first attribute indication information of the first cell generated by the generation module to the UE, so that the UE obtains the first attribute indication information of the first cell, and determines a transmitting manner of a downlink signal of the first cell according to the obtained first attribute indication information of the first cell.

During specific implementation, the network node may be an RNC or a base station. When the network node is an RNC, the network node may send the first attribute indication information of the first cell to the UE by using RRC signaling. The RRC signaling includes system information, RRC connection setup information, first cell information, radio bearer setup information, radio bearer reconfiguration information, radio bearer release information, physical channel reconfiguration information, transport channel reconfiguration information, cell update confirm information, and measurement control information.

During specific implementation, the radio access standard supported for signal transmitting by the first cell that is indicated by the first attribute indication information of the first cell may be UMTS, LTE, GSM, CDMA, or the like.

During specific implementation, the frequency band supported for signal transmitting by the first cell that is indicated by the first attribute indication information of the first cell may include a location of a frequency channel number (the frequency channel number is a number for a fixed frequency) and/or bandwidth.

In an implementation, the first attribute indication information of the first cell is used to indicate signal transmit power of the first cell or a signal transmitting scheduling status of the first cell.

During specific implementation, the modulation mode supported by the first cell that is indicated by the first attribute indication information of the first cell may include at least one of QPSK, 16QAM, 64QAM, or 256QAM.

During specific implementation, the MIMO antenna mode supported for signal transmitting by the first cell that is indicated by the first attribute indication information of the first cell may include at least one of a non-MIMO mode, a 2*2MIMO mode, or a 4*4MIMO mode.

In an implementation, the MIMO antenna mode supported by the first cell is indicated by secondary pilot information of the first cell included in the first attribute indication information of the first cell. The secondary pilot information is used to indicate whether the first cell is configured with an S-CPICH. If the first cell is configured with an S-CPICH, it indicates that the MIMO antenna mode supported by the first cell is a multi-antenna mode (that is, a MIMO mode). If the first cell is not configured with an S-CPICH, optionally rather than determinately, it indicates that the MIMO antenna mode supported by the first cell is a single antenna mode (that is, a non-MIMO mode).

In an implementation, the secondary pilot information is used to indicate whether the first cell is configured with a code channel number of an S-CPICH. If the first cell is configured with a code channel number of an S-CPICH, it indicates that the MIMO antenna mode supported by the first cell is a multi-antenna mode, and the corresponding channel number is used. If the first cell is not configured with an S-CPICH, optionally rather than determinately, it indicates that the MIMO antenna mode supported by the first cell is a single antenna mode.

In an implementation, the secondary pilot information is used to indicate whether the first cell is configured with transmit power of an S-CPICH. If the first cell is configured with transmit power of an S-CPICH, it indicates that the MIMO antenna mode supported by the first cell is a multi-antenna mode, and the corresponding transmit power is used. If the first cell is not configured with an S-CPICH, optionally rather than determinately, it indicates that the MIMO antenna mode supported by the first cell is a single antenna mode. The transmit power of the S-CPICH may be represented by using a power offset of the transmit power of the S-CPICH relative to transmit power of a primary pilot P-CPICH.

During specific implementation, after the RNC sends the first attribute indication information of the first cell to the UE, the UE determines that a type of the modulation mode supported by the first cell is one of the two modulation modes QPSK and 16QAM, and the UE needs only to detect, between the two modes QPSK and 16QAM, a modulation mode being used by the first cell, and does not need to detect the two modulation modes 64QAM and 256QAM, thereby reducing a detection range of the UE, and improving detection accuracy.

In an implementation, the first attribute indication information of the first cell may further carry release information supported for signal transmitting by the first cell and/or first identification information of an attribute supported for signal transmitting by the first cell, where the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

In an implementation, the generation module 600 is further configured to generate second attribute indication information of the first cell, where the second attribute indication information includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting.

In an implementation, the sending module 601 is further configured to:

transmit, to the UE, a first channel used to carry second identification information, where the second identification information is used to identify the second attribute indication information of the first cell, so that the UE obtains the second identification information by using the detected first channel, and determines the second attribute indication information of the first cell according to the second identification information.

During specific implementation, the network node may also be a base station. When the network node is a base station, the network node obtains the second attribute indication information (including at least one of the radio access standard, the frequency band, the PCI, the modulation mode, or the MIMO antenna mode currently used by the first cell for signal transmitting) currently used by the first cell, generates, according to the second attribute indication information, the second identification information used to identify the second attribute indication information, carries the second identification information on the preset first channel, and then sends the first channel to the UE. The second attribute indication information includes third identification information of each attribute. The third identification information may be represented by using bit identification information.

During specific implementation, when the network node detects that the modulation mode currently used by the first cell is QPSK, the network node sets, in the second identification information carried on the first channel, third identification information used to identify the modulation mode to bit identification information 00, and transmits the first channel.

During specific implementation, when obtaining, from the second identification information, the third identification information used to indicate the modulation mode currently used by the first cell, the UE may determine, according to the third identification information, the modulation mode currently used by the first cell. For another attribute of the first cell for signal transmitting, refer to the foregoing embodiment, and details are not described again in this embodiment.

During specific implementation, the UE obtains the second attribute indication information by using the channel that is used to indicate the second attribute indication information and transmitted by the network node or by using the transmitted channel that carries the second identification information of the second attribute indication information, to learn each attribute currently used by the first cell, thereby directly determining the modulation mode currently used by the first cell for signal transmitting, without a need to additionally detect all modulation modes of the first cell.

In an implementation, the network node transmits, to the UE, a second channel used to indicate the second attribute indication information of the first cell, so that the UE obtains the second attribute indication information of the first cell by using the detected second channel. The second attribute indication information of the first cell is used to indicate at least one of the radio access standard currently used by the first cell for signal transmitting, the frequency band currently used by the first cell for signal transmitting, the PCI currently used by the first cell for signal transmitting, the modulation mode currently used by the first cell for signal transmitting, or the MIMO antenna mode currently used by the first cell for signal transmitting.

By means of the present application, the network node generates first attribute indication information of a first cell, where the first cell is any cell other than a cell serving user equipment (UE), and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and the network node sends the first attribute indication information of the first cell, so that the UE obtains the first attribute indication information of the first cell, and determines a transmitting manner of a downlink signal of the first cell according to the obtained first attribute indication information of the first cell. Before the UE detects an attribute of an interfering cell for signal transmitting, the network node informs the UE of first attribute indication information of the interfering cell, including at least one of a radio access standard, a frequency band, a PCI, a modulation mode, or a MIMO antenna mode supported for signal transmitting by the interfering cell. In this way, a range in which the UE detects the attribute of the interfering cell for signal transmitting can be reduced, resources used in a detection process can be reduced, and detection accuracy can be improved, thereby accurately canceling interference of an interfering signal transmitted by the interfering cell.

FIG. 7 is a schematic structural diagram of another embodiment of a network node in the embodiments of the present application. The network node shown in FIG. 7 includes a transceiver apparatus 700 and a processor 701 (the network node may have one or more processors 701, and an example of one processor is used in FIG. 7). In this embodiment of the present application, the transceiver apparatus and the processor 701 maybe connected by using a bus or in another manner. An example in which the transceiver apparatus 700 and the processor 701 are connected by using a bus is used in FIG. 7.

The processor 701 is configured to generate first attribute indication information of a first cell, where the first cell is any cell other than a cell serving user equipment (UE), and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell.

The transceiver apparatus 700 is configured to send the first attribute indication information of the first cell to the UE, so that the UE obtains the first attribute indication information of the first cell, and determines a transmitting manner of a downlink signal of the first cell according to the obtained first attribute indication information of the first cell.

During specific implementation, the network node may be an RNC or a base station. When the network node is an RNC, the network node may send the first attribute indication information of the first cell to the UE by using RRC signaling. The RRC signaling includes system information, RRC connection setup information, first cell information, radio bearer setup information, radio bearer reconfiguration information, radio bearer release information, physical channel reconfiguration information, transport channel reconfiguration information, cell update confirm information, and measurement control information.

During specific implementation, the radio access standard supported for signal transmitting by the first cell that is indicated by the first attribute indication information of the first cell may be UMTS, LTE, GSM, CDMA, or the like.

During specific implementation, the frequency band supported for signal transmitting by the first cell that is indicated by the first attribute indication information of the first cell may include a location of a frequency channel number (the frequency channel number is a number for a fixed frequency) and/or bandwidth.

During specific implementation, the modulation mode supported by the first cell that is indicated by the first attribute indication information of the first cell may include at least one of QPSK, 16QAM, 64QAM, or 256QAM.

During specific implementation, the MIMO antenna mode supported for signal transmitting by the first cell that is indicated by the first attribute indication information of the first cell may include at least one of a non-MIMO mode, a 2*2MIMO mode, or a 4*4MIMO mode.

During specific implementation, after the RNC sends the first attribute indication information of the first cell to the UE, the UE determines that a type of the modulation mode supported by the first cell is one of the two modulation modes QPSK and 16QAM, and the UE needs only to detect, between the two modes QPSK and 16QAM, a modulation mode being used by the first cell, and does not need to detect the two modulation modes 64QAM and 256QAM, thereby reducing a detection range of the UE, and improving detection accuracy.

In an implementation, the MIMO antenna mode supported for signal transmitting by the first cell is indicated by secondary pilot information of the first cell included in the first attribute indication information of the first cell.

In an implementation, the first attribute indication information of the first cell carries release information supported for signal transmitting by the first cell and/or first identification information of an attribute supported for signal transmitting by the first cell, where the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

In an implementation, the processor 701 is further configured to generate second attribute indication information of the first cell, where the second attribute indication information includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting.

In an implementation, the transceiver apparatus 700 is further configured to transmit, to the UE, a first channel used to carry second identification information, where the second identification information is used to identify the second attribute indication information of the first cell, so that the UE obtains the second identification information by using the detected first channel, and determines the second attribute indication information of the first cell according to the second identification information.

During specific implementation, the network node may also be a base station. When the network node is a base station, the network node obtains the second attribute indication information (including at least one of the radio access standard, the frequency band, the PCI, the modulation mode, or the MIMO antenna mode currently used by the first cell for signal transmitting) currently used by the first cell, generates, according to the second attribute indication information, the second identification information used to identify the second attribute indication information, carries the second identification information on the preset first channel, and then sends the first channel to the UE. The second attribute indication information includes third identification information of each attribute. The third identification information may be represented by using bit identification information.

During specific implementation, when the network node detects that the modulation mode currently used by the first cell is QPSK, the network node sets, in the second identification information carried on the first channel, third identification information used to identify the modulation mode to bit identification information 00, and transmits the first channel.

During specific implementation, when obtaining, from the second identification information, the third identification information used to indicate the modulation mode currently used by the first cell, the UE may determine, according to the third identification information, the modulation mode currently used by the first cell. For another attribute of the first cell for signal transmitting, refer to the foregoing embodiment, and details are not described again in this embodiment.

During specific implementation, the UE obtains the second attribute indication information by using the channel that is used to indicate the second attribute indication information and transmitted by the network node or by using the transmitted channel that carries the second identification information of the second attribute indication information, to learn each attribute currently used by the first cell, thereby directly determining the modulation mode currently used by the first cell for signal transmitting, without a need to additionally detect all modulation modes of the first cell.

In an implementation, the network node transmits, to the UE, a second channel used to indicate the second attribute indication information of the first cell, so that the UE obtains the second attribute indication information of the first cell by using the detected second channel. The second attribute indication information of the first cell is used to indicate at least one of the radio access standard currently used by the first cell for signal transmitting, the frequency band currently used by the first cell for signal transmitting, the PCI currently used by the first cell for signal transmitting, the modulation mode currently used by the first cell for signal transmitting, or the MIMO antenna mode currently used by the first cell for signal transmitting.

By means of the present application, the network node generates first attribute indication information of a first cell, where the first cell is any cell other than a cell serving user equipment (UE), and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and the network node sends the first attribute indication information of the first cell, so that the UE obtains the first attribute indication information of the first cell, and determines a transmitting manner of a downlink signal of the first cell according to the obtained first attribute indication information of the first cell. Before the UE detects an attribute of an interfering cell for signal transmitting, the network node informs the UE of first attribute indication information of the interfering cell, including at least one of a radio access standard, a frequency band, a PCI, a modulation mode, or a MIMO antenna mode supported for signal transmitting by the interfering cell. In this way, a range in which the UE detects the attribute of the interfering cell for signal transmitting can be reduced, resources used in a detection process can be reduced, and detection accuracy can be improved, thereby accurately canceling interference of an interfering signal transmitted by the interfering cell.

Referring to FIG. 8, FIG. 8 is a schematic flowchart of an embodiment of a method for determining a transmitting manner of a downlink signal of a cell in the embodiments of the present application.

As shown in FIG. 8, the embodiment of the method for determining a transmitting manner of a downlink signal of a cell in the embodiments of the present application may include the following steps.

S800. user equipment (UE) obtains first attribute indication information of a first cell, where the first cell is any cell other than a cell serving the UE, and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell.

During specific implementation, the UE may obtain the first attribute indication information of the first cell by using a network node (the network node is an RNC or a base station). When the network node is an RNC, the UE obtains the first attribute indication information by using RRC signaling sent by the network node. When the network node is a base station, the UE obtains the first attribute indication information by using physical layer signaling sent by the network node. The RNC is a key network element of a 3G network, is an integral part of an access network, and is also a switching and control element of the access network. The RNC is mainly used to manage and control multiple base stations. Functions of the RNC include a radio resource management function and a control function. The radio resource management function is mainly used to maintain stability of radio propagation and service quality of a wireless connection. The control function includes all functions related to radio bearer setup, maintenance, and release. The base station may be a base station serving the UE, or may be a base station serving the first cell. In this embodiment of the present application, the first cell is any cell other than the cell serving the UE. For the UE, the first cell is an interfering cell or a neighboring cell. Therefore, a downlink signal transmitted by the first cell is an interfering signal.

During specific implementation, the foregoing mode supported by the first cell may include a mode currently used by the first cell, or may include a mode that is not currently used by the first cell but can be used by the first cell.

During specific implementation, the radio access standard supported for signal transmitting by the first cell may include UMTS, LTE, GSM, CDMA, or the like. UMTS is a 3G mobile telephone technology. UMTS integrates a 3G technology and is a subsequent standard of the GSM standard. A premise for implementing UMTS is a currently widely used GSM mobile telephone system, which is a 2G system. LTE is long term evolution, formulated by the Third Generation Partnership Project, of a UMTS technology standard. LTE introduces key technologies such as orthogonal frequency division multiplexing and MIMO. GSM is a mobile telephone standard most widely applied at present, and is considered as a 2G mobile telephone system. CDMA is a wireless communications technology, and may be used for any protocol in the second generation and third generation wireless communications. CDMA is compatible with other cellular technologies, achieving roaming across a country.

During specific implementation, the frequency band supported for signal transmitting by the first cell that is indicated by the first attribute indication information of the first cell may include a location of a frequency channel number (the frequency channel number is a number for a fixed frequency) and/or bandwidth. The frequency band supported for signal transmitting by the first cell that is indicated by the first attribute indication information may be an entire frequency band, a partial frequency band, or a partial frequency band overlapped with a frequency band of the cell serving the UE, used for signal transmitting by the first cell.

In an implementation, the first attribute indication information of the first cell is used to indicate signal transmit power of the first cell or a signal transmitting scheduling status of the first cell. The scheduling status is used to indicate a data scheduling status or a signaling sending status or the like of the first cell in a selected frequency band, and specifically includes statuses such as whether the first cell is scheduling data or sending signaling.

During specific implementation, the modulation mode supported for signal transmitting by the first cell that is indicated by the first attribute indication information of the first cell may include at least one of QPSK, 16QAM, 64QAM, or 256QAM. QPSK is a modulation method for conveying data by means of conversion or modulation, and is used for phasing of a reference signal. QAM is a modulation mode for performing amplitude modulation on two orthogonal carriers, and a signal set transmitted by using QAM may be conveniently represented by using a constellation graph. Each constellation point in the constellation graph corresponds to one signal of the transmitted signal set. A size of the transmitted signal set of the orthogonal amplitude modulation is A, and is generally represented by using A-QAM. Common QAM forms include 16QAM, 64QAM, 256QAM, and the like. A larger transmitted signal set indicates a larger volume of data carried on same bandwidth.

During specific implementation, the MIMO antenna mode indicated by the first attribute indication information of the first cell includes at least one of a single antenna mode or a multi-antenna mode. The single antenna mode is a non-MIMO mode, and the multi-antenna mode is any one of a 2*2MIMO mode or a 4*4MIMO mode. A MIMO technology refers to using multiple transmit antennas and receive antennas at a transmit end and a receive end of a base station of the first cell respectively, so that signals are transmitted and received by using the multiple antennas at the transmit end and the receive end, thereby improving communication quality. The MIMO antenna mode may be indicated by using N*M MIMO, where N represents a quantity of transmit antennas, and M represents a quantity of receive antennas. Therefore, 2*2MIMO is used to indicate that a quantity of transmit antennas is 2, and a quantity of receive antennas is 2.

During specific implementation, PCI is a multi-antenna sending technology in which corresponding processing is performed on a transmitted signal by using channel status information obtained by a transmit end, to cancel mutual interference during data sending, so that a signal in transmission and a transport channel are better matched, to improve system performance. If the MIMO antenna mode supported for signal transmitting by the first cell is the 2*2MIMO mode, the PCI supported for signal transmitting by the first cell that is indicated by the first attribute indication information includes at least one PCI in four PCIs. If the MIMO antenna mode supported for signal transmitting by the first cell is the 4*4MIMO mode, the PCI supported for signal transmitting by the first cell that is indicated by the first attribute indication information includes at least one PCI in 16 PCIs.

S801. The UE obtains a transmitting manner of a downlink signal of the first cell according to the obtained first attribute indication information of the first cell.

During specific implementation, the UE determines the transmitting manner of the downlink signal of the first cell according to the received first attribute indication information of the first cell, where the transmitting manner of the downlink signal of the first cell includes at least one of the following: the radio access standard supported for signal transmitting by the first cell, the frequency band supported for signal transmitting by the first cell, the precoding control indication (PCI) supported for signal transmitting by the first cell, the modulation mode supported for signal transmitting by the first cell, or the multiple-input multiple-output (MIMO) antenna mode supported for signal transmitting by the first cell. An example in which the first attribute indication information includes one transmitting manner (for example, includes the modulation mode supported by the first cell) is used. If the modulation mode supported by the first cell that is indicated by the first attribute indication information includes QPSK and 16QAM (where the first cell is capable of using QPSK and 16QAM, but the first cell currently uses QPSK), the UE determines that the first cell supports the QPSK modulation mode or the 16QAM modulation mode, and therefore eliminates a possibility that the first cell supports the 64QAM and 256QAM modulation modes. Alternatively, if the modulation mode supported by the first cell that is indicated by the first attribute indication information does not include such types as 64QAM and 256QAM (that is, the first cell is not capable of using 64QAM and 256QAM), the UE can directly eliminate a possibility that the first cell supports the 64QAM and 256QAM modulation modes. Therefore, the UE needs only to detect, between the two modes QPSK and 16QAM, a modulation mode being used by the first cell, and does not need to detect the two modulation modes 64QAM and 256QAM, thereby reducing a detection range of the UE, and improving detection accuracy. When detecting that the first cell uses QPSK, the UE determines that the transmitting manner of the first cell is the QPSK modulation mode. That the UE detects, between the two modes QPSK and 16QAM, a modulation mode being used by the first cell belongs to the prior art, and details are not described in this embodiment.

During specific implementation, an example in which the first attribute indication information includes two or more transmitting manners (for example, includes the modulation mode supported by the first cell and the multiple-input multiple-output (MIMO) antenna mode supported for signal transmitting by the first cell) is used. If the modulation mode supported by the first cell that is indicated by the first attribute indication information includes QPSK and 16QAM, and the MIMO antenna mode supported by the first cell that is indicated by the first attribute indication information includes the 2*2MIMO mode and the 4*4MIMO mode (where the first cell is capable of using the 2*2MIMO mode and the 4*4MIMO mode, but the first cell currently uses the 2*2MIMO mode), or if the modulation mode indicated by the first attribute indication information does not include such types as 64QAM and 256QAM, and the MIMO antenna mode indicated by the first attribute indication information does not include a non-MIMO mode, the UE determines that the first cell supports either of the QPSK and 16QAM modulation modes, and supports either of the 2*2MIMO mode and the 4*4MIMO mode. When detecting that the first cell uses the QPSK modulation mode and the 2*2MIMO mode, the UE determines that the transmitting manner of the first cell is the QPSK modulation mode and the 2*2MIMO mode.

By means of the present application, user equipment (UE) obtains first attribute indication information of a first cell, where the first cell is any cell other than a cell serving the UE, and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and the UE determines a transmitting manner of a downlink signal of the first cell according to the obtained first attribute indication information of the first cell. Before the UE detects an attribute of an interfering cell for signal transmitting, a network node informs the UE of first attribute indication information of the interfering cell, including at least one of a radio access standard, a frequency band, a PCI, a modulation mode, or a MIMO antenna mode supported for signal transmitting by the interfering cell. In this way, a range in which the UE detects the attribute of the interfering cell for signal transmitting can be reduced, resources used in a detection process can be reduced, and detection accuracy can be improved, thereby accurately canceling interference of an interfering signal transmitted by the interfering cell.

Figure 9:
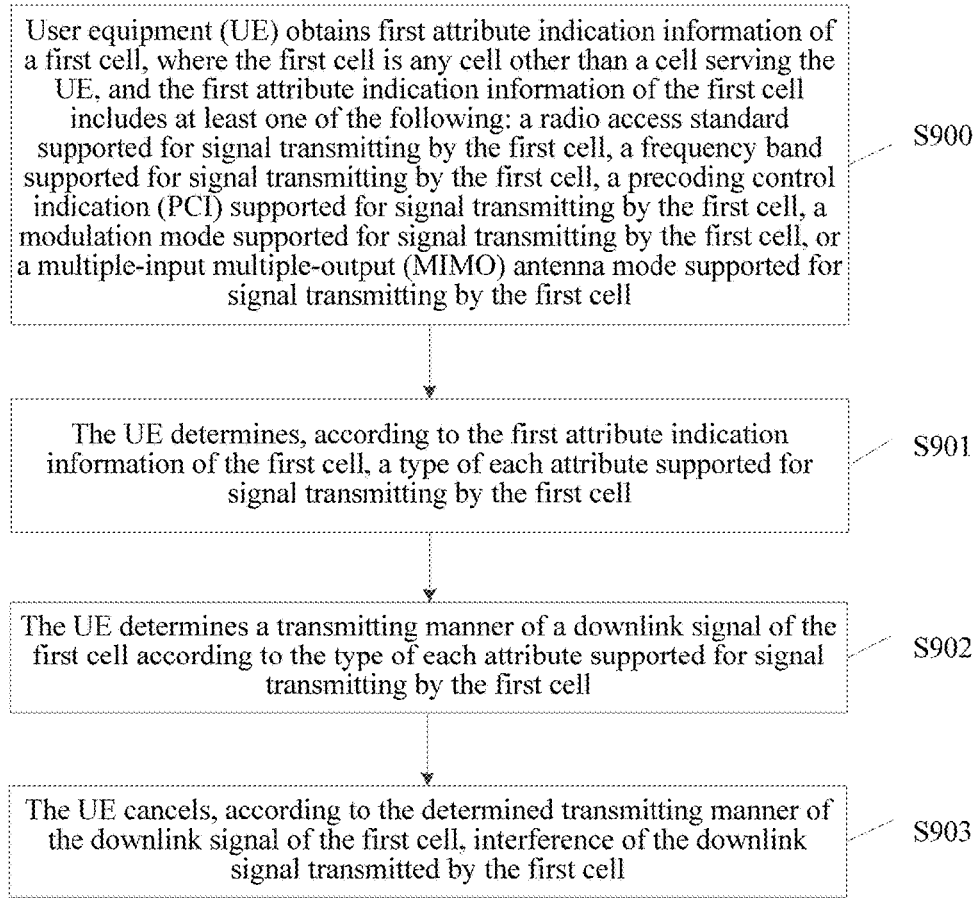
FIG. 9 is a schematic flowchart of another embodiment of a method for determining a transmitting manner of a downlink signal of a cell in the embodiments of the present application.

Referring to FIG. 9, FIG. 9 is a schematic flowchart of another embodiment of a method for determining a transmitting manner of a downlink signal of a cell in the embodiments of the present application. A network node in this embodiment of the present application may be an RNC or a base station. That is, the network node may send the first attribute indication information to the UE by using RRC signaling or by using physical layer signaling. In this embodiment, the network node tends to send the first attribute indication information by using RRC signaling.

As shown in FIG. 9, the other embodiment of the method for determining a transmitting manner of a downlink signal of a cell in the embodiments of the present application may include the following steps.

S900. User equipment (UE) obtains first attribute indication information of a first cell, where the first cell is any cell other than a cell serving the UE, and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell.

During specific implementation, the RNC may send the first attribute indication information of the first cell to the UE by using RRC signaling. The RRC signaling includes system information, RRC connection setup information, first cell information, radio bearer setup information, radio bearer reconfiguration information, radio bearer release information, physical channel reconfiguration information, transport channel reconfiguration information, cell update confirm information, and measurement control information.

During specific implementation, the foregoing mode supported by the first cell may include a mode currently used by the first cell, or may include a mode that is not currently used by the first cell but can be used by the first cell.

During specific implementation, the radio access standard supported for signal transmitting by the first cell that is indicated by the first attribute indication information of the first cell may include UMTS, LTE, GSM, CDMA, or the like.

During specific implementation, the frequency band supported for signal transmitting by the first cell that is indicated by the first attribute indication information of the first cell may include a location of a frequency channel number (the frequency channel number is a number for a fixed frequency) and/or bandwidth. The frequency band supported for signal transmitting by the first cell that is indicated by the first attribute indication information may be an entire frequency band, a partial frequency band, or a partial frequency band overlapped with a frequency band of the cell serving the UE, used for signal transmitting by the first cell.

In an implementation, the first attribute indication information of the first cell is used to indicate signal transmit power of the first cell or a signal transmitting scheduling status of the first cell. The scheduling status is used to indicate a data scheduling status or a signaling sending status or the like of the first cell in a selected frequency band, and specifically includes statuses such as whether the first cell is scheduling data or sending signaling.

During specific implementation, the modulation mode supported by the first cell that is indicated by the first attribute indication information of the first cell may include at least one of QPSK, 16QAM, 64QAM, or 256QAM.

During specific implementation, the MIMO antenna mode supported for signal transmitting by the first cell that is indicated by the first attribute indication information of the first cell may include at least one of a non-MIMO mode, a 2*2MIMO mode, or a 4*4MIMO mode.

In an implementation, the MIMO antenna mode supported by the first cell is indicated by secondary pilot information of the first cell included in the first attribute indication information of the first cell. The secondary pilot information is used to indicate whether the first cell is configured with an S-CPICH. If the first cell is configured with an S-CPICH, it indicates that the MIMO antenna mode supported by the first cell is a multi-antenna mode. If the first cell is not configured with an S-CPICH, it indicates that the MIMO antenna mode supported by the first cell is a single antenna mode (that is, a non-MIMO mode).

In an implementation, the secondary pilot information is used to indicate whether the first cell is configured with a code channel number of an S-CPICH. If the first cell is configured with a code channel number of an S-CPICH, it indicates that the MIMO antenna mode supported by the first cell is a multi-antenna mode, and the corresponding channel number is used. If the first cell is not configured with an S-CPICH, optionally rather than determinately, it indicates that the MIMO antenna mode supported by the first cell is a single antenna mode.

In an implementation, the secondary pilot information is used to indicate whether the first cell is configured with transmit power of an S-CPICH. If the first cell is configured with transmit power of an S-CPICH, it indicates that the MIMO antenna mode supported by the first cell is a multi-antenna mode, and the corresponding transmit power is used. If the first cell is not configured with an S-CPICH, optionally rather than determinately, it indicates that the MIMO antenna mode supported by the first cell is a single antenna mode. The transmit power of the S-CPICH may be represented by using a power offset of the transmit power of the S-CPICH relative to transmit power of a primary pilot P-CPICH.

S901. The UE determines, according to the first attribute indication information of the first cell, a type of each attribute supported for signal transmitting by the first cell.

During specific implementation, an example in which an attribute included in the first attribute indication information includes the modulation mode supported by the first cell is used (the attribute included in the first attribute indication information is at least one of the following: the radio access standard supported for signal transmitting by the first cell, the frequency band supported for signal transmitting by the first cell, the precoding control indication (PCI) supported for signal transmitting by the first cell, the modulation mode supported for signal transmitting by the first cell, or the multiple-input multiple-output (MIMO) antenna mode supported for signal transmitting by the first cell). If the modulation mode indicated by the first attribute indication information includes such types as QPSK and 16QAM (where the first cell is capable of using QPSK and 16QAM, but the first cell currently uses QPSK), the UE determines that the type of the modulation mode supported by the first cell is QPSK or 16QAM, and therefore eliminates a possibility that the first cell supports the 64QAM and 256QAM modulation modes. Alternatively, if the modulation mode indicated by the first attribute indication information does not include such types as 64QAM and 256QAM, the UE can directly eliminate a possibility that the first cell supports the 64QAM and 256QAM modulation modes.

During specific implementation, an example in which an attribute included in the first attribute indication information includes the modulation mode and the MIMO antenna mode supported by the first cell is used. If the modulation mode indicated by the first attribute indication information includes such types as QPSK and 16QAM, and the MIMO antenna mode indicated by the first attribute indication information includes such types as the 2*2MIMO mode and the 4*4MIMO mode (where the first cell is capable of using the 2*2MIMO mode and the 4*4MIMO mode, but the first cell currently uses the 2*2MIMO mode), the UE determines that the type of the modulation mode supported by the first cell is QPSK or 16QAM, and determines that the type of the MIMO antenna mode supported by the first cell is the 2*2MIMO mode or the 4*4MIMO mode.

S902. The UE determines a transmitting manner of a downlink signal of the first cell according to the type of each attribute supported for signal transmitting by the first cell.

During specific implementation, after determining that the type of the modulation mode supported by the first cell is one of the two modulation modes QPSK and 16QAM, the UE needs only to detect, between the two modes QPSK and 16QAM, a modulation mode being used by the first cell, and does not need to detect the two modulation modes 64QAM and 256QAM, thereby reducing a detection range of the UE, and improving detection accuracy. When detecting that the first cell uses QPSK, the UE determines that the transmitting manner of the first cell is the QPSK-type modulation mode.

During specific implementation, when the UE determines that the type of the modulation mode supported by the first cell is QPSK or 16QAM, and determines that the type of the MIMO antenna mode supported by the first cell is the 2*2MIMO mode or the 4*4MIMO mode, when detecting that the first cell uses the QPSK-type modulation mode and the 2*2MIMO-type mode, the UE determines that the transmitting manner of the first cell is the QPSK modulation mode and the 2*2MIMO mode.

In an implementation, the first attribute indication information of the first cell may further carry release information supported for signal transmitting by the first cell and/or first identification information of the attribute supported for signal transmitting by the first cell, where the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

During specific implementation, the first attribute indication information of the first cell may carry the release information supported for signal transmitting by the first cell. The release information supported for signal transmitting by the first cell and the radio access standard supported by the first cell, the frequency band supported by the first cell, the PCI supported by the first cell, the modulation mode supported by the first cell, and the MIMO antenna mode supported by the first cell are mutually bound. The release information supported by the first cell may be represented by using release N, where N is used to indicate a release number. For example, for a cell whose release is less than release 5, it indicates that a modulation mode supported by the cell is 64QAM, and a MIMO antenna mode supported for signal transmitting by the cell is a single antenna mode (that is, a non-MIMO mode). A cell whose release is greater than or equal to release 7 has a multi-antenna mode (a MIMO mode).

During specific implementation, the first attribute indication information of the first cell may carry the first identification information of the attribute (including at least one of the radio access standard, the frequency band, the PCI, the modulation mode, or the MIMO antenna mode supported for signal transmitting by the first cell) supported for signal transmitting by the first cell. When the first cell has a supported or used attribute, the first attribute indication information carries first identification information of the attribute. In addition, when the first cell has an attribute that is not supported or used, the first attribute indication information may also carry first identification information of the attribute that is not supported or used. For example, a MIMO antenna mode supported by a cell whose release is greater than or equal to release 7 may be the 2*2MIMO mode. Therefore, when the first cell supports the 2*2MIMO mode, the first attribute indication information may carry first identification information indicating that the first cell supports the 2*2MIMO mode, and therefore the UE determines, according to the identification, that the first cell supports the 2*2MIMO mode. If the first cell does not support the 2*2MIMO mode, the first attribute indication information may also carry first identification information indicating that the first cell does not support the 2*2MIMO mode, and therefore the UE determines, according to the first identification information, that the first cell does not support the 2*2MIMO mode, and the UE does not detect the 2*2MIMO mode. For another example, if the first cell uses 64QAM, the first attribute indication information may carry first identification information indicating that the first cell uses 64QAM, and therefore the UE determines, according to the first identification information, that the first cell uses 64QAM. If the first cell does not use 64QAM but is capable of using 64QAM, the first attribute indication information may also carry first identification information indicating that the first cell does not use 64QAM, and therefore the UE determines, according to the identification, that the first cell does not use 64QAM.

During specific implementation, the first attribute indication information of the first cell may carry the release information supported for signal transmitting by the first cell and the first identification information of the attribute supported for signal transmitting by the first cell. For example, if the release information of the first cell is release 10, a radio access standard supported by the first cell, a frequency band supported by the first cell, a PCI supported by the first cell, and a modulation mode supported by the first cell when a release is release 10 are learned; moreover, because the release of the first cell is greater than or equal to release 7, the first cell supports a multi-antenna mode (including the 2*2MIMO mode and the 4*4MIMO mode). If the first cell uses the 2*2MIMO mode, the first identification information may be used to indicate that the first cell uses the 2*2MIMO mode. Therefore, after obtaining the release information supported for signal transmitting by the first cell and the first identification information of the attribute supported for signal transmitting by the first cell, the UE not only can learn, by using the release information of the first cell, the radio access standard supported by the first cell, the frequency band supported by the first cell, the PCI supported by the first cell, and the modulation mode supported by the first cell, but also can learn, by using the first identification information, that a multi-antenna mode used by the first cell is the 2*2MIMO mode.

In an implementation, the network node may also send the first attribute indication information of the first cell to the UE by using physical layer signaling. The physical layer signaling may be an HS-SCCH or another dedicated physical channel.

S903. The UE cancels, according to the determined transmitting manner of the downlink signal of the first cell, interference of the downlink signal transmitted by the first cell.

During specific implementation, after the UE determines the transmitting manner of the downlink signal of the first cell, the UE reconstructs the received downlink signal, and performs, according to the transmitting manner of the downlink signal of the first cell, interference cancellation on the downlink signal transmitted by the first cell, to improve a signal-to-noise ratio of a downlink signal of the serving cell of the UE, so that the serving cell provides a downlink service with better quality to the UE.

By means of the present application, user equipment (UE) obtains first attribute indication information of a first cell sent by a network node, where the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and the UE determines a transmitting manner of a downlink signal of the first cell according to the obtained first attribute indication information of the first cell. Before the UE detects an attribute of an interfering cell for signal transmitting, the network node informs the UE of first attribute indication information of the interfering cell, including at least one of a radio access standard, a frequency band, a PCI, a modulation mode, or a MIMO antenna mode supported for signal transmitting by the interfering cell. In this way, a range in which the UE detects the attribute of the interfering cell for signal transmitting can be reduced, resources used in a detection process can be reduced, and detection accuracy can be improved, thereby accurately canceling interference of an interfering signal transmitted by the interfering cell.

Figure 10:
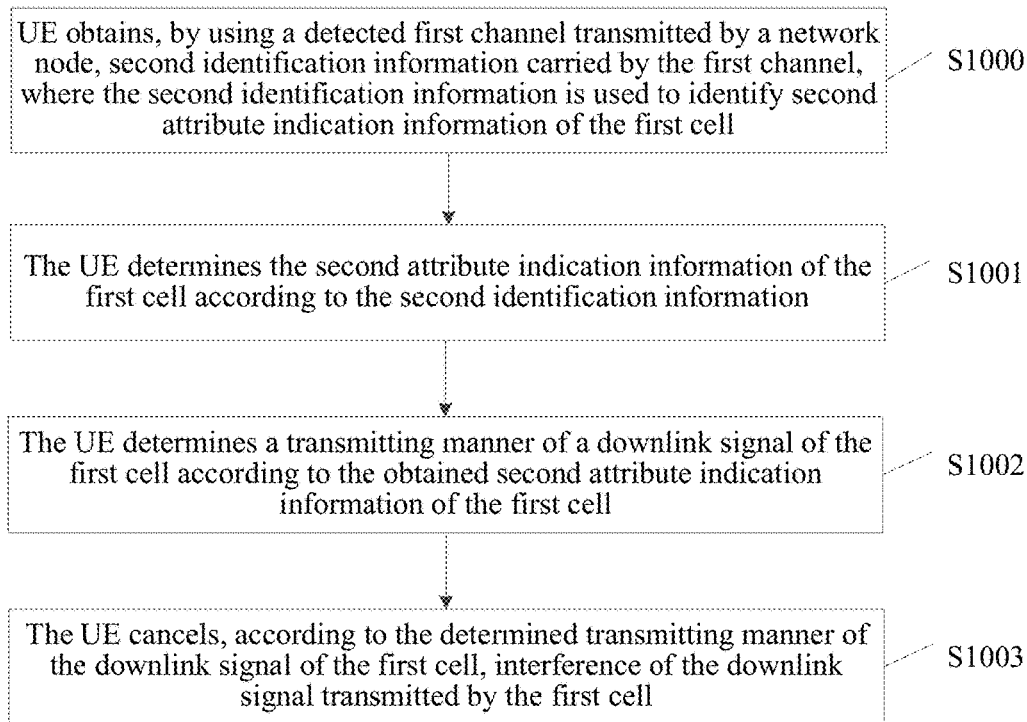
FIG. 10 is a schematic flowchart of another embodiment of a method for determining a transmitting manner of a downlink signal of a cell in the embodiments of the present application.

Referring to FIG. 10, FIG. 10 is a schematic flowchart of another embodiment of a method for determining a transmitting manner of a downlink signal of a cell in the embodiments of the present application. An example in which a network node is a base station is used for description in this embodiment. It should be noted that, the base station may be a base station serving UE, or may be a base station serving a first cell. In this embodiment of the present application, the base station may inform, by using physical layer signaling or RRC signaling, the UE of each attribute being currently used by the first cell, so that the UE can directly determine a transmitting manner of a downlink signal of the first cell according to each attribute being currently used by the first cell. In this embodiment, the network node sends second attribute indication information by using physical layer signaling. The second attribute indication information may be included in the first attribute indication information, and the UE may obtain the second attribute indication information from the first attribute indication information.

As shown in FIG. 10, the other embodiment of the method for determining a transmitting manner of a downlink signal of a cell in the embodiments of the present application may include the following steps.

S1000. The UE obtains, by using a detected first channel transmitted by a network node, second identification information carried by the first channel, where the second identification information is used to identify second attribute indication information of the first cell.

During specific implementation, the second attribute indication information includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting.

During specific implementation, the base station obtains the second attribute indication information (including at least one of the radio access standard, the frequency band, the PCI, the modulation mode, or the MIMO antenna mode currently used by the first cell for signal transmitting) currently used by the first cell, generates, according to the second attribute indication information, the second identification information used to identify the second attribute indication information, carries the second identification information on the preset first channel, and then sends the first channel to the UE. The second attribute indication information includes third identification information of each attribute. The third identification information may be represented by using bit identification information. Using an example in which the third identification information indicates the modulation mode currently used by the first cell, as shown in Table 1, modulation modes may be separately indicated by using different third identification information.

TABLE 1

| Bit | Indicated modulation mode |
|---|---|
| 00 | QPSK |
| 01 | 16QAM |
| 10 | 64QAM |
| 11 | 256QAM |

During specific implementation, when the base station detects that the modulation mode currently used by the first cell is QPSK, the base station sets, in the second identification information carried on the first channel, the third identification information used to identify the modulation mode to bit identification information 00, and transmits the first channel. If the base station detects, after a preset time period, that the modulation mode currently used by the first cell changes to 16QAM, the base station changes, in the second identification information carried on the first channel, the third identification information used to identify the modulation mode to bit identification information 01, and continues to transmit the first channel. When detecting the first channel again, the UE obtains the second identification information carried by the first channel, and obtains, from the second identification information, the third identification information used to indicate the modulation mode currently used by the first cell.

S1001. The UE determines the second attribute indication information of the first cell according to the second identification information.

During specific implementation, when obtaining, from the second identification information, the third identification information used to indicate the modulation mode currently used by the first cell, the UE may determine, according to the third identification information, the modulation mode currently used by the first cell. Specifically, when the UE obtains that the third identification information of the modulation mode currently used by the first cell is the bit identification information 00, the UE may determine that the modulation mode currently used by the first cell is QPSK. When the identification information changes to the bit identification information 01 after the preset time period, the UE determines that the modulation mode currently used by the first cell changes to 16QAM. For another attribute of the first cell for signal transmitting, refer to the foregoing embodiment, and details are not described again in this embodiment.

In an implementation, the UE may obtain, by using a detected second channel transmitted by the base station, the second attribute indication information of the first cell, where the second channel is used to indicate the second attribute indication information of the first cell.

During specific implementation, the network node obtains an attribute (including at least one of the radio access standard, the frequency band, the PCI, the modulation mode, or the MIMO antenna mode currently used by the first cell for signal transmitting) currently used by the first cell for signal transmitting, carries, on the preset second channel, information related to the attribute currently used by the first cell for signal transmitting, so that the preset second channel is used to indicate the attribute currently used by the first cell for signal transmitting, and then transmits the second channel in an on-off keying manner. For example, it is specified that the second channel is used to indicate that a modulation mode supported by the first cell in the second attribute indication information is 64QAM and/or 256QAM. When learning that the first cell is using the 64QAM modulation mode and/or the 256QAM modulation mode, the network node transmits the second channel; otherwise, the network node does not transmit the second channel. When detecting the second channel transmitted by the network node, the UE may determine that the first cell uses 64QAM and/or 256QAM. If the UE does not detect the second channel transmitted by the network node, the UE may consider that the first cell does not use 64QAM and/or 256QAM, and therefore eliminate a possibility that the first cell uses 64QAM and/or 256QAM. Therefore, the UE does not need to detect the two modulation modes 64QAM and 256QAM. Alternatively, when learning that the first cell does not use the 64QAM modulation mode and/or the 256QAM modulation mode, the network node may also transmit the second channel; otherwise, the network node does not transmit the second channel. When detecting the second channel transmitted by the network node, the UE may learn that the first cell does not use 64QAM and/or 256QAM. If the UE does not detect the second channel transmitted by the network node, the UE may directly determine that the first cell uses 64QAM and/or 256QAM.

S1002. The UE determines a transmitting manner of a downlink signal of the first cell according to the obtained second attribute indication information of the first cell.

During specific implementation, the UE obtains the second attribute indication information by using the channel that is used to indicate the second attribute indication information and transmitted by the base station or by using the transmitted channel that carries the second identification information of the second attribute indication information, to learn each attribute currently used by the first cell, thereby directly determining the modulation mode currently used by the first cell for signal transmitting, without a need to additionally detect all modulation modes of the first cell.

S1003. The UE cancels, according to the determined transmitting manner of the downlink signal of the first cell, interference of the downlink signal transmitted by the first cell.

During specific implementation, after the UE determines the transmitting manner of the downlink signal of the first cell, the UE reconstructs the received downlink signal, and performs, according to the transmitting manner of the downlink signal of the first cell, interference cancellation on the downlink signal transmitted by the first cell, to improve a signal-to-noise ratio of a downlink signal of the serving cell of the UE, so that the serving cell provides a downlink service with better quality to the UE.

By means of the present application, user equipment (UE) obtains second attribute indication information of a first cell from a network node, where the second attribute indication information includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting; and the UE determines a transmitting manner of a downlink signal of the first cell according to the obtained second attribute indication information of the first cell. Before the UE detects an attribute of an interfering cell for signal transmitting, the network node informs the UE of second attribute indication information of the interfering cell, including at least one of a radio access standard, a frequency band, a PCI, a modulation mode, or a MIMO antenna mode currently used by the interfering cell for signal transmitting. In this way, the UE can directly determine a transmitting manner of a downlink signal of the interfering cell, and therefore accurately cancel interference of an interfering signal transmitted by the interfering cell.

Figure 11:
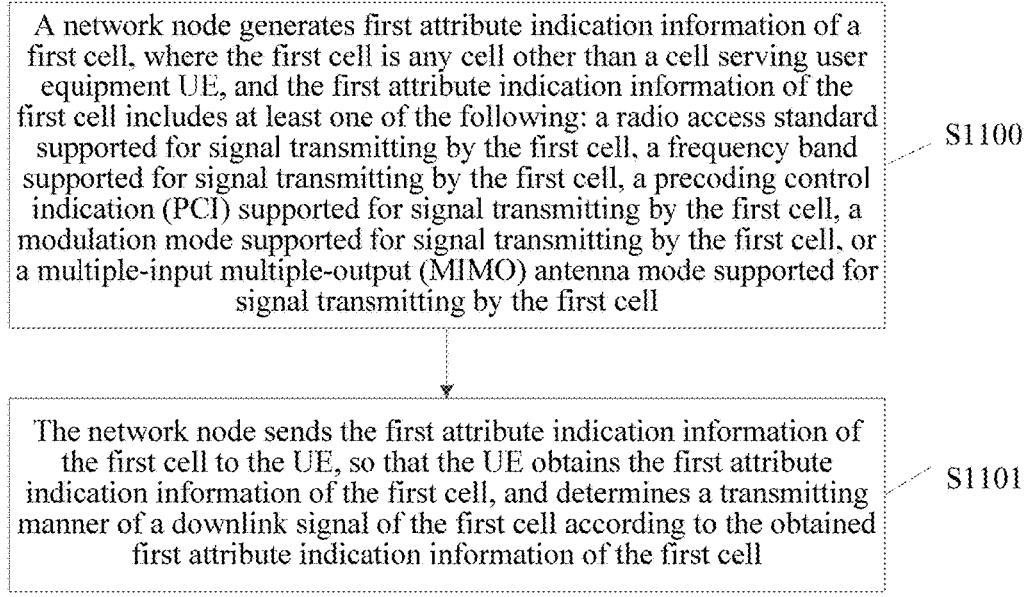
FIG. 11 is a schematic flowchart of another embodiment of a method for determining a transmitting manner of a downlink signal of a cell in the embodiments of the present application.

Referring to FIG. 11, FIG. 11 is a schematic flowchart of another embodiment of a method for determining a transmitting manner of a downlink signal of a cell in the embodiments of the present application.

As shown in FIG. 11, the other embodiment of the method for determining a transmitting manner of a downlink signal of a cell in the embodiments of the present application may include the following steps.

S1100. A network node generates first attribute indication information of a first cell, where the first cell is any cell other than a cell serving user equipment (UE), and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell.

During specific implementation, the network node may be an RNC or a base station. When the network node is an RNC, the network node may send the first attribute indication information of the first cell to the UE by using RRC signaling or physical layer signaling. In this embodiment, the RNC tends to send the first attribute indication information of the first cell to the UE by using RRC signaling. The RRC signaling includes system information, RRC connection setup information, first cell information, radio bearer setup information, radio bearer reconfiguration information, radio bearer release information, physical channel reconfiguration information, transport channel reconfiguration information, cell update confirm information, and measurement control information.

During specific implementation, the foregoing mode supported by the first cell may include a mode currently used by the first cell, or may include a mode that is not currently used by the first cell but can be used by the first cell.

During specific implementation, the radio access standard supported for signal transmitting by the first cell that is indicated by the first attribute indication information of the first cell may be UMTS, LTE, GSM, CDMA, or the like.

During specific implementation, the frequency band supported for signal transmitting by the first cell that is indicated by the first attribute indication information of the first cell may include a location of a frequency channel number (the frequency channel number is a number for a fixed frequency) and/or bandwidth.

In an implementation, the first attribute indication information of the first cell is used to indicate signal transmit power of the first cell or a signal transmitting scheduling status of the first cell.

During specific implementation, the modulation mode supported by the first cell that is indicated by the first attribute indication information of the first cell may include at least one of QPSK, 16QAM, 64QAM, or 256QAM.

During specific implementation, the MIMO antenna mode supported for signal transmitting by the first cell that is indicated by the first attribute indication information of the first cell may include at least one of a non-MIMO mode, a 2*2MIMO mode, or a 4*4MIMO mode.

In an implementation, the MIMO antenna mode supported by the first cell is indicated by secondary pilot information of the first cell included in the first attribute indication information of the first cell. The secondary pilot information is used to indicate whether the first cell is configured with an S-CPICH. If the first cell is configured with an S-CPICH, it indicates that the MIMO antenna mode supported by the first cell is a multi-antenna mode (that is, a MIMO mode). If the first cell is not configured with an S-CPICH, optionally rather than determinately, it indicates that the MIMO antenna mode supported by the first cell is a single antenna mode (that is, a non-MIMO mode).

In an implementation, the secondary pilot information is used to indicate whether the first cell is configured with a code channel number of an S-CPICH. If the first cell is configured with a code channel number of an S-CPICH, it indicates that the MIMO antenna mode supported by the first cell is a multi-antenna mode, and the corresponding channel number is used. If the first cell is not configured with an S-CPICH, optionally rather than determinately, it indicates that the MIMO antenna mode supported by the first cell is a single antenna mode.

In an implementation, the secondary pilot information is used to indicate whether the first cell is configured with transmit power of an S-CPICH. If the first cell is configured with transmit power of an S-CPICH, it indicates that the MIMO antenna mode supported by the first cell is a multi-antenna mode, and the corresponding transmit power is used. If the first cell is not configured with an S-CPICH, optionally rather than determinately, it indicates that the MIMO antenna mode supported by the first cell is a single antenna mode. The transmit power of the S-CPICH may be represented by using a power offset of the transmit power of the S-CPICH relative to transmit power of a primary pilot P-CPICH.

During specific implementation, the network node may also send the first attribute indication information of the first cell to the UE by using physical layer signaling. The physical layer signaling may be an HS-SCCH or another dedicated physical channel.

In an implementation, the network node further generates second attribute indication information of the first cell, where the second attribute indication information includes at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting.

In an implementation, the network node transmits, to the UE, a first channel used to carry second identification information, where the second identification information is used to identify the second attribute indication information of the first cell, so that the UE obtains the second identification information by using the detected first channel, and determines the second attribute indication information of the first cell according to the second identification information.

During specific implementation, the network node may also be a base station. When the network node is a base station, the network node obtains the second attribute indication information (including at least one of the radio access standard, the frequency band, the PCI, the modulation mode, or the MIMO antenna mode currently used by the first cell for signal transmitting) currently used by the first cell, generates, according to the second attribute indication information, the second identification information used to identify the second attribute indication information, carries the second identification information on the preset first channel, and then sends the first channel to the UE. The second attribute indication information includes third identification information of each attribute. The third identification information may be represented by using bit identification information.

During specific implementation, when the network node detects that the modulation mode currently used by the first cell is QPSK, the network node sets, in the second identification information carried on the first channel, third identification information used to identify the modulation mode to bit identification information 00, and transmits the first channel.

During specific implementation, when obtaining, from the second identification information, the third identification information used to indicate the modulation mode currently used by the first cell, the UE may determine, according to the third identification information, the modulation mode currently used by the first cell. For another attribute of the first cell for signal transmitting, refer to the foregoing embodiment, and details are not described again in this embodiment.

During specific implementation, the UE obtains the second attribute indication information by using the channel that is used to indicate the second attribute indication information and transmitted by the network node or by using the transmitted channel that carries the second identification information of the second attribute indication information, to learn each attribute currently used by the first cell, thereby directly determining the modulation mode currently used by the first cell for signal transmitting, without a need to additionally detect all modulation modes of the first cell.

In an implementation, the network node transmits, to the UE, a second channel used to indicate the second attribute indication information of the first cell, so that the UE obtains the second attribute indication information of the first cell by using the detected second channel. The second attribute indication information of the first cell is used to indicate at least one of the radio access standard currently used by the first cell for signal transmitting, the frequency band currently used by the first cell for signal transmitting, the PCI currently used by the first cell for signal transmitting, the modulation mode currently used by the first cell for signal transmitting, or the MIMO antenna mode currently used by the first cell for signal transmitting.

During specific implementation, the network node obtains an attribute (including at least one of the radio access standard, the frequency band, the PCI, the modulation mode, or the MIMO antenna mode currently used by the first cell for signal transmitting) currently used by the first cell for signal transmitting, carries, on the preset second channel, information related to the attribute currently used by the first cell for signal transmitting, so that the preset second channel is used to indicate the attribute currently used by the first cell for signal transmitting, and then transmits the second channel in an on-off keying manner. For example, it is specified that the second channel is used to indicate that the modulation mode supported by the first cell in the second attribute indication information is 64QAM and/or 256QAM. When learning that the first cell is using the 64QAM modulation mode and/or the 256QAM modulation mode, the network node transmits the second channel; otherwise, the network node does not transmit the second channel. When detecting the second channel transmitted by the network node, the UE may determine that the first cell uses 64QAM and/or 256QAM. If the UE does not detect the second channel transmitted by the network node, the UE may consider that the first cell does not use 64QAM and/or 256QAM, and therefore eliminate a possibility that the first cell uses 64QAM and/or 256QAM. Therefore, the UE does not need to detect the two modulation modes 64QAM and 256QAM. Alternatively, when learning that the first cell does not use the 64QAM modulation mode and/or the 256QAM modulation mode, the network node may also transmit the second channel; otherwise, the network node does not transmit the second channel. When detecting the second channel transmitted by the network node, the UE may learn that the first cell does not use 64QAM and/or 256QAM. If the UE does not detect the second channel transmitted by the network node, the UE may directly determine that the first cell uses 64QAM and/or 256QAM.

S1101. The network node sends the first attribute indication information of the first cell to the UE, so that the UE obtains the first attribute indication information of the first cell, and determines a transmitting manner of a downlink signal of the first cell according to the obtained first attribute indication information of the first cell.

During specific implementation, after the network node sends the first attribute indication information of the first cell to the UE, the UE determines that a type of the modulation mode supported by the first cell is one of the two modulation modes QPSK and 16QAM, and the UE needs only to detect, between the two modes QPSK and 16QAM, a modulation mode being used by the first cell, and does not need to detect the two modulation modes 64QAM and 256QAM, thereby reducing a detection range of the UE, and improving detection accuracy.

In an implementation, the first attribute indication information of the first cell may further carry release information supported for signal transmitting by the first cell and/or first identification information of an attribute supported for signal transmitting by the first cell, where the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

In an implementation, if the network node sends the second attribute indication information of the first cell to the UE, the UE determines the downlink signal of the first cell for signal transmitting according to the second attribute indication information.

By means of the present application, a network node generates first attribute indication information of a first cell, where the first cell is any cell other than a cell serving user equipment (UE), and the first attribute indication information of the first cell includes at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell; and the network node sends the first attribute indication information of the first cell, so that the UE obtains the first attribute indication information of the first cell, and determines a transmitting manner of a downlink signal of the first cell according to the obtained first attribute indication information of the first cell. Before the UE detects an attribute of an interfering cell for signal transmitting, the network node informs the UE of first attribute indication information of the interfering cell, including at least one of a radio access standard, a frequency band, a PCI, a modulation mode, or a MIMO antenna mode currently used by the interfering cell for signal transmitting. In this way, the UE can directly determine a transmitting manner of a downlink signal of the interfering cell, and therefore accurately cancel interference of an interfering signal transmitted by the interfering cell.

With descriptions of the foregoing embodiments, a person skilled in the art may clearly understand that the present application may be implemented by hardware, firmware or a combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in definition of a medium to which they belong. For example, a disk and disc used by the present application includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

What are disclosed above are merely exemplary embodiments of the present application, and certainly are not intended to limit the protection scope of the present application. Therefore, equivalent variations made in accordance with the claims of the present application shall fall within the scope of the present application.

What is claimed is:

1. User equipment (UE), comprising:
a transceiver apparatus configured to:
obtain first attribute indication information of a first cell, wherein the first cell is any cell other than a cell serving the UE, and the first attribute indication information of the first cell comprises at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell;
a processor configured to:
determine, according to the first attribute indication information of the first cell, a type of each attribute supported for signal transmitting by the first cell, and determine a transmitting manner of the downlink signal of the first cell according to the type of each attribute supported for signal transmitting by the first cell; and
wherein the first attribute indication information of the first cell carries release information supported for signal transmitting by the first cell and/or first identification information of the attribute supported for signal transmitting by the first cell, the release information and the first identification information of the attribute both for indicating at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

2. The UE according to claim 1, wherein when the first attribute indication information of the first cell comprises the MIMO antenna mode supported for signal transmitting by the first cell, the MIMO antenna mode supported for signal transmitting by the first cell is indicated by secondary pilot information of the first cell comprised in the first attribute indication information of the first cell.

3. The UE according to claim 1, wherein:
the transceiver apparatus is further configured to obtain second attribute indication information of the first cell, wherein the second attribute indication information comprises at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting; and
the processor is further configured to determine the transmitting manner of the downlink signal of the first cell according to the obtained second attribute indication information of the first cell.

4. The UE according to claim 3, wherein:
the transceiver apparatus is further configured to obtain, by using a first channel transmitted by a network node and detected by the processor, second identification information carried by the first channel; and
the processor is further configured to determine the second attribute indication information of the first cell according to the second identification information.

5. A network node, comprising:
a processor configured to generate first attribute indication information of a first cell, wherein the first cell is any cell other than a cell serving user equipment (UE), and the first attribute indication information of the first cell comprises at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell;
a transceiver apparatus configured to send the first attribute indication information of the first cell to the UE for obtaining the first attribute indication information of the first cell and determining a transmitting manner of a downlink signal of the first cell according to the obtained first attribute indication information of the first cell; and
wherein the first attribute indication information of the first cell carries release information supported for signal transmitting by the first cell and/or first identification information of an attribute supported for signal transmitting by the first cell, the release information and the first identification information of the attribute both for indicating at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

6. The network node according to claim 5, wherein when the first attribute indication information of the first cell comprises the MIMO antenna mode supported for signal transmitting by the first cell, the MIMO antenna mode supported for signal transmitting by the first cell is indicated by secondary pilot information of the first cell comprised in the first attribute indication information of the first cell.

7. The network node according to claim 5, wherein the processor is further configured to generate second attribute indication information of the first cell, wherein the second attribute indication information comprises at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting.

8. The network node according to claim 7, wherein the transceiver apparatus is further configured to transmit, to the UE, a first channel for carrying second identification information for determining the second attribute indication information of the first cell according to the second identification information.

9. A method for determining a transmitting manner of a downlink signal of a cell, the method comprising:
obtaining, by user equipment (UE), first attribute indication information of a first cell, wherein the first cell is any cell other than a cell serving the UE, and the first attribute indication information of the first cell comprises at least one of the following: a radio access standard supported for signal transmitting by the first cell, a frequency band supported for signal transmitting by the first cell, a precoding control indication (PCI) supported for signal transmitting by the first cell, a modulation mode supported for signal transmitting by the first cell, or a multiple-input multiple-output (MIMO) antenna mode supported for signal transmitting by the first cell;
determining, by the UE according to the first attribute indication information of the first cell, a type of each attribute supported for signal transmitting by the first cell;
determining, by the UE, a transmitting manner of the downlink signal of the first cell according to the type of each attribute supported for signal transmitting by the first cell; and
wherein the first attribute indication information of the first cell carries release information supported for signal transmitting by the first cell and/or first identification information of the attribute supported for signal transmitting by the first cell, wherein the release information and the first identification information of the attribute are both used to indicate at least one of the radio access standard supported for signal transmitting by the first cell, the frequency band supported for signal transmitting by the first cell, the PCI supported for signal transmitting by the first cell, the modulation mode supported for signal transmitting by the first cell, or the MIMO antenna mode supported for signal transmitting by the first cell.

10. The method according to claim 9, wherein when the first attribute indication information of the first cell comprises the MIMO antenna mode supported for signal transmitting by the first cell, the MIMO antenna mode supported for signal transmitting by the first cell is indicated by secondary pilot information of the first cell comprised in the first attribute indication information of the first cell.

11. The method according to claim 9, further comprising:
obtaining, by the UE, second attribute indication information of the first cell, wherein the second attribute indication information comprises at least one of the following: a radio access standard currently used by the first cell for signal transmitting, a frequency band currently used by the first cell for signal transmitting, a precoding control indication (PCI) currently used by the first cell for signal transmitting, a modulation mode currently used by the first cell for signal transmitting, or a multiple-input multiple-output (MIMO) antenna mode currently used by the first cell for signal transmitting; and
wherein determining, by the UE, a transmitting manner of a downlink signal of the first cell according to the obtained first attribute indication information of the first cell comprises:
determining, by the UE, the transmitting manner of the downlink signal of the first cell according to the obtained second attribute indication information of the first cell.

12. The method according to claim 11, wherein obtaining the second attribute indication information of the first cell comprises:
obtaining, by the UE, using a detected first channel transmitted by a network node, second identification information carried by the first channel; and
determining, by the UE, the second attribute indication information of the first cell according to the second identification information.

* * * * *